United States Patent
Latham

(10) Patent No.: US 12,395,103 B2
(45) Date of Patent: Aug. 19, 2025

(54) STANDSTILL ANGLE DETECTION FOR SALIENT MOTORS

(71) Applicant: Haier US Appliance Solutions, Inc., Wilmington, DE (US)

(72) Inventor: Joseph Wilson Latham, Louisville, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 161 days.

(21) Appl. No.: 18/187,404

(22) Filed: Mar. 21, 2023

(65) Prior Publication Data

US 2024/0322717 A1 Sep. 26, 2024

(51) Int. Cl.
*H02P 6/18* (2016.01)
*H02P 21/18* (2016.01)

(52) U.S. Cl.
CPC ............. *H02P 6/183* (2013.01); *H02P 21/18* (2016.02); *H02P 2203/03* (2013.01); *H02P 2203/11* (2013.01)

(58) Field of Classification Search
None
See application file for complete search history.

(56) References Cited

U.S. PATENT DOCUMENTS

| | | |
|---|---|---|
| 5,254,918 A | 10/1993 | Ueki |
| 6,753,665 B2 | 6/2004 | Ueda et al. |
| 6,793,167 B2 | 9/2004 | Karkos, Jr. et al. |
| 6,864,647 B2 | 3/2005 | Duncan et al. |
| 6,949,900 B1 | 9/2005 | Berringer |
| 7,045,988 B2 | 5/2006 | Ha et al. |
| 7,301,298 B2 | 11/2007 | Shao et al. |
| 7,893,649 B2 | 2/2011 | Lamprecht |
| 8,100,668 B2 | 1/2012 | Yoo et al. |

(Continued)

FOREIGN PATENT DOCUMENTS

| | | | |
|---|---|---|---|
| CN | 103780192 A | * | 5/2014 |
| CN | 103812390 A | | 5/2014 |

(Continued)

OTHER PUBLICATIONS

S. D. Sudhoff, K. A. Corzine and H. J. Hegner, "A flux-weakening strategy for current-regulated surface-mounted permanent-magnet machine drives," in IEEE Transactions on Energy Conversion, Sep. 1995, vol. 10, No. 3, pp. 431-437.

(Continued)

*Primary Examiner* — Said Bouziane
(74) *Attorney, Agent, or Firm* — Dority & Manning, P.A.

(57) ABSTRACT

A method for operating a salient motor is provided. In one example implementation, the method can include determining, via a controller of the motor, a series of estimated injection angles. The method can further include injecting, via the controller, a high-frequency signal into the motor at each of the series of estimated injection angles to provide a series of high-frequency signal injections. The method can further include, responsive to each of the series of high-frequency signal injections, processing, via the controller, one or more signals associated with each of the series of high-frequency signal injections. The method can further include determining, via the controller, one or more operating parameters based at least in part on the series of estimated injection angles.

20 Claims, 10 Drawing Sheets

(56) References Cited

U.S. PATENT DOCUMENTS

| | | |
|---|---|---|
| 8,339,081 B2 | 12/2012 | Patel et al. |
| 8,704,469 B2 | 4/2014 | Tadano |
| 9,143,066 B2 | 9/2015 | Yang et al. |
| 9,397,595 B2 | 7/2016 | Halkosaari et al. |
| 9,397,596 B2 | 7/2016 | Baker |
| 9,399,991 B2 | 7/2016 | Dainez et al. |
| 9,518,578 B2 | 12/2016 | Dainez et al. |
| 9,543,865 B2 | 1/2017 | Hano |
| 9,780,718 B2 | 10/2017 | Barfus et al. |
| 9,850,890 B2 | 12/2017 | Lim et al. |
| 10,111,558 B2 | 10/2018 | Dickson, Jr. et al. |
| 10,174,753 B2 | 1/2019 | Kusumba et al. |
| 10,224,851 B2 | 3/2019 | Huh et al. |
| 10,273,948 B1 | 4/2019 | Goodjohn et al. |
| 10,622,870 B2 | 4/2020 | Campbell et al. |
| 10,742,143 B2 | 8/2020 | Roemmelmayer et al. |
| 10,784,805 B1 | 9/2020 | Bojoi et al. |
| 11,050,370 B2 | 6/2021 | Yamamoto |
| 11,374,519 B2 | 6/2022 | Yajurvedi et al. |
| 11,406,224 B2 | 8/2022 | Cunningham |
| 11,434,883 B2 | 9/2022 | Latham et al. |
| 11,444,558 B1 | 9/2022 | Latham et al. |
| 2008/0001571 A1 | 1/2008 | Tomigashi |
| 2010/0148710 A1 | 6/2010 | Lim et al. |
| 2013/0193886 A1 | 8/2013 | Yoon et al. |
| 2013/0287602 A1 | 10/2013 | Suzuki et al. |
| 2015/0042249 A1* | 2/2015 | Lin .................. H02P 6/183 318/400.33 |
| 2016/0254771 A1 | 9/2016 | Qiao et al. |
| 2018/0013374 A1* | 1/2018 | Barfus ................ B01F 27/1126 |
| 2019/0186480 A1 | 6/2019 | Kulkarni et al. |
| 2020/0362842 A1 | 11/2020 | Hahn et al. |
| 2021/0050807 A1 | 2/2021 | Xu et al. |
| 2021/0259472 A1 | 8/2021 | Seidler et al. |
| 2022/0006403 A1 | 1/2022 | Sasaki et al. |
| 2022/0120292 A1 | 4/2022 | Brewer et al. |
| 2022/0376639 A1 | 11/2022 | Latham et al. |

FOREIGN PATENT DOCUMENTS

| | | |
|---|---|---|
| CN | 108347207 A | 7/2018 |
| CN | 106357183 B | 9/2018 |
| CN | 106655940 B | 5/2019 |
| CN | 110323984 A | 10/2019 |
| CN | 111425383 A | 7/2020 |
| CN | 111464084 A | 7/2020 |
| CN | 113676106 A | 11/2021 |
| EP | 3098449 A1 | 11/2016 |
| EP | 3883121 A1 | 9/2021 |
| JP | 2006304452 A | 11/2006 |

OTHER PUBLICATIONS

M. J. Corley and R. D. Lorenz, "Rotor position and velocity estimation for a salient-pole permanent magnet synchronous machine at standstill and high speeds," in IEEE Transactions on Industry Applications, Jul.-Aug. 1998, vol. 34, No. 4, pp. 784-789.

* cited by examiner

STANDSTILL ANGLE DETECTION FOR SALIENT MOTORS

FIELD

Example aspects of the present disclosure relate to high-frequency signal injection methods for standstill angle detection of synchronous-type (e.g., salient) motor drives in appliances.

BACKGROUND

Modern kitchen appliances having synchronous-type (e.g., salient) motor drives are generally used to perform and/or automate a variety of tasks. For instance, stand mixers are generally used for performing automated mixing, churning, or kneading involved in food preparation. Typically, stand mixers include a motor configured to provide torque to one or more driveshafts. Users may connect various utensils to the one or more driveshafts, including whisks, spatulas, or the like. Critical to the function and operation of appliances such as the stand mixer, a robust motor drive is needed that is capable of both low speed, high torque operation and high speed, low torque operation. In current practice, brushed direct current (DC) motors are used to drive appliances such as the stand mixer. Over time, however, the "brushes" in a brushed DC motor break down, which can result in decreased motor life and increased maintenance costs.

SUMMARY

Aspects and advantages of embodiments of the present disclosure will be set forth in part in the following description, or can be learned from the description, or can be learned through practice of the embodiments.

One example aspect of the present disclosure is directed to an appliance (e.g., a stand mixer) having a base, a head pivotally mounted to the base, a mixer shaft rotatably mounted on the head, and a motor assembly disposed within the head. The motor assembly can include a motor comprising at least a rotor and a stator, a motor drive, a sensorless feedback system, and a controller operably coupled to the motor and the sensorless feedback system. The sensorless feedback system can be configured to determine an orientation of the rotor of the motor based at least in part on one or more electrical characteristics of the stator of the motor. The controller can be configured to determine a series of estimated injection angles, inject a high-frequency signal into the motor at each of the series of estimated injection angles to provide a series of high-frequency signal injections, process one or more signals associated with each of the high-frequency signal injections, and determine one or more operating parameters based at least in part on each of the series of estimated injection angles.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which.

Figure 1:
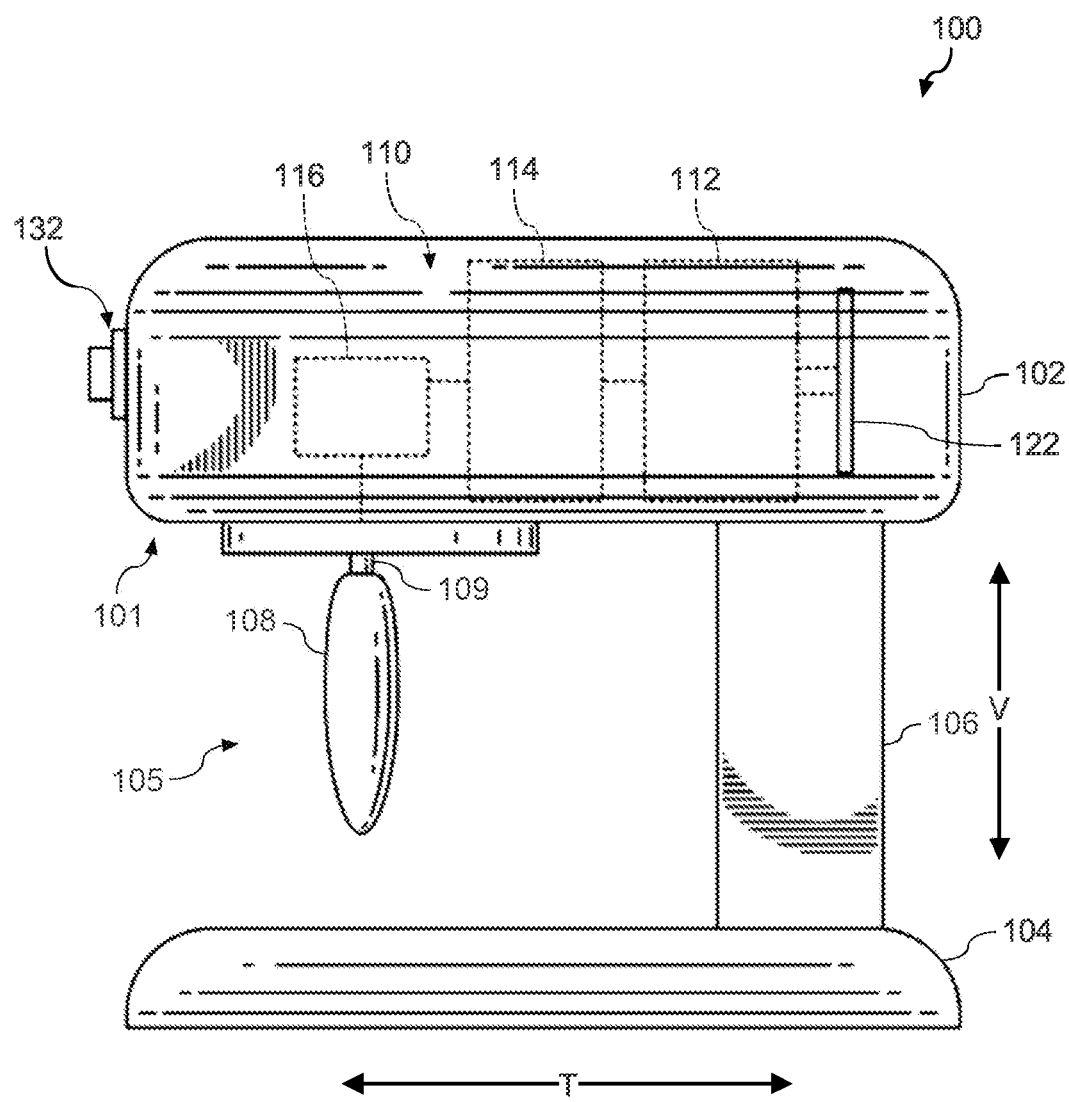
FIG. 1 depicts a side-section view of a stand mixer according to example embodiments of the present disclosure.

Repeat use of reference characters in the present specification and drawings is intended to represent the same and/or analogous features or elements of the present invention.

DETAILED DESCRIPTION

Reference now will be made in detail to embodiments, one or more examples of which are illustrated in the drawings. Each example is provided by way of explanation of the embodiments, not limitation of the present disclosure. In fact, it will be apparent to those skilled in the art that various modifications and variations can be made to the embodiments without departing from the scope or spirit of the present disclosure. For instance, features illustrated or described as part of one embodiment can be used with another embodiment to yield a still further embodiment. Thus, it is intended that aspects of the present disclosure cover such modifications and variations.

Example aspects of the present disclosure relate generally to synchronous-type (e.g., salient) motor drives in appliances, such as, e.g., stand mixers. For instance, example aspects of the present disclosure relate to a method for injecting a series of high-frequency signals into a stator winding of the motor in order to determine an initial angle (e.g., orientation) of a rotor of the motor. Example aspects of the present disclosure are generally discussed with reference to stand mixer appliances for illustrative purposes. However, those having ordinary skill in the art will understand the systems and methods disclosed herein are by no means limited exclusively to stand mixer appliances and can be applied to any suitable appliance having a synchronous-type (e.g., salient) motor drive. Furthermore, those having ordinary skill in the art will understand that the term "synchronous-type" and "salient" can be used interchangeably when referring to the motor of the present disclosure.

According to example aspects of the present disclosure, an appliance can include a synchronous-type motor and a three-phase motor drive operating in field-oriented control (FOC). Synchronous-type motors operating in field-oriented control provide high efficiency and high-fidelity speed and/or position control. However, FOC schemes require accurate knowledge of the flux angle or rotor magnetic field ($\vec{B}_r$) of the rotor to correctly orient a stator magnetic field ($\vec{B}_s$). Thus, before starting the motor, the initial rotor angle ($\theta_e$) must be determined in order to appropriately align the stator field. It is possible to acquire this information directly with some type of sensor (e.g., encoder, x3 Hall effect sensor, displacement sensor, etc.). However, sensored approaches are often more costly and less reliable than a sensorless approach. As such, an appliance operating in a sensorless FOC scheme is desirable.

Accordingly, example aspects of the present disclosure provide an appliance having a synchronous-type motor with a three-phase motor drive operating in a sensorless FOC scheme. More particularly, the appliance can include a brushless DC (BLDC) motor or a permanent magnet synchronous motor (PMSM) and a three-phase motor drive. Furthermore, the appliance can include a sensorless feedback system configured to determine an initial angle of the rotor in order to appropriately align the stator field. In some embodiments, the sensorless feedback system can provide a series of high-frequency signal injections by injecting a series of high-frequency voltage signals into a stator winding of the motor. The sensorless feedback system can utilize saliency effects (i.e., inductance changes with rotor orientation) and saturation effects (i.e., inductance changes with current) induced in the motor by the series of high-frequency voltage injections in order to determine the initial rotor angle of the motor.

Accordingly, example aspects of the present disclosure provide a method for operating a salient motor of an appliance by implementing a series of high-frequency signal injections in order to determine an initial rotor angle of the motor. More particularly, the series of high-frequency signal injections can be implemented at one or more estimated injection angles of a series of estimated injection angles, and one or more signals associated with each of the series of high-frequency signal injections can be compared to accurately determine the initial rotor angle of the motor.

Aspects of the present disclosure provide technical effects and benefits. For instance, by utilizing the saliency effects and the saturation effects induced in the motor by the series of high-frequency signal injections, the sensorless feedback system can appropriately align the stator field prior to starting the motor. In this way, example aspects of the present disclosure provide an appliance capable of operating in a sensorless FOC scheme. Furthermore, because the series of signal injections are high frequency, example aspects of the present disclosure can be performed in a quick manner, thereby reducing the time needed to start the motor. Furthermore, if the motor has cogging angles (which is common for salient motors), the series of estimated injection angles can be aligned to the cogging angles, thereby increasing the chances that the rotor is aligned to one of the series of estimated injection angles which, in turn, provides more accurate and reliable results.

As used herein, the terms "first," "second," and "third" may be used interchangeably to distinguish one component from another and are not intended to signify location or importance of the individual components. The terms "includes" and "including" are intended to be inclusive in a manner similar to the term "comprising." Similarly, the term "or" is generally intended to be inclusive (e.g., "A or B" is intended to mean "A or B or both"). The term "at least one of" in the context of, e.g., "at least one of A, B, and C" refers to only A, only B, only C, or any combination of A, B, and C. In addition, here and throughout the specification and claims, range limitations may be combined and/or interchanged. Such ranges are identified and include all the sub-ranges contained therein unless context or language indicates otherwise. For example, all ranges disclosed herein are inclusive of the endpoints, and the endpoints are independently combinable with each other. The singular forms "a," "an," and "the" include plural references unless the context clearly dictates otherwise.

Approximating language, as used herein throughout the specification and claims, may be applied to modify any quantitative representation that could permissibly vary without resulting in a change in the basic function to which it is related. Accordingly, a value modified by a term or terms, such as "generally," "about," "approximately," and "substantially," are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 10 percent margin, i.e., including values within ten percent greater or less than the stated value. In this regard, for example, when used in the context of an angle or direction, such terms include within ten degrees greater or less than the stated angle or direction, e.g., "generally vertical" includes forming an angle of up to ten degrees in any direction, e.g., clockwise or counterclockwise, with the vertical direction V.

The word "exemplary" is used herein to mean "serving as an example, instance, or illustration." In addition, references to "an embodiment" or "one embodiment" does not necessarily refer to the same embodiment, although it may. Any implementation described herein as "exemplary" or "an embodiment" is not necessarily to be construed as preferred or advantageous over other implementations. Moreover, each example is provided by way of explanation of the invention, not limitation of the invention. In fact, it will be apparent to those skilled in the art that various modifications and variations can be made in the present invention without departing from the scope of the invention. For instance, features illustrated or described as part of one embodiment can be used with another embodiment to yield a still further embodiment. Thus, it is intended that the present invention covers such modifications and variations as come within the scope of the appended claims and their equivalents.

FIG. 1 provides a side, elevation view of a stand mixer 100 according to an example embodiment of the present subject matter. It will be understood that stand mixer 100 is provided by way of example only and that the present subject matter may be used in or with any suitable stand mixer in alternative example embodiments. Moreover, stand mixer 100 of FIG. 1 defines a vertical direction V and a transverse direction T, which are perpendicular to each other. It should be understood that these directions are presented for example purposes only, and that relative positions and locations of certain aspects of stand mixer 100 may vary according to specific embodiments, spatial placement, or the like.

Stand mixer 100 may include a casing 101. In detail, casing 101 may include a motor housing 102, a base 104, and a column 106. Motor housing 102 may house various mechanical and/or electrical components of stand mixer 100, which will be described in further detail below. For example, as shown in FIG. 1, a motor 112, a reduction gearbox 114, and a bevel gearbox 116 may be disposed within motor housing 102. Base 104 may support motor housing 102. For example, motor housing 102 may be mounted (e.g., pivotally) to base 104 via column 106, e.g., that extends upwardly (e.g., along the vertical direction V) from base 104. Motor housing 102 may be suspended over a mixing zone 105, within which a mixing bowl may be disposed and/or mounted to base 104.

A drivetrain 110 may be provided within motor housing 102 and is configured for coupling motor 112 to a shaft 109 (e.g., a mixer shaft), such that shaft 109 is rotatable via motor 112 through drivetrain 110. In this way, the motor 112 can be operably coupled to the mixer shaft 109. Drivetrain 110 may include planetary gearbox 114, bevel gearbox 116, etc. An opening 132 for a horizontal output shaft 130 (FIG. 3) may align with the rotational axis of motor 112. Mixer shaft 109 may be positioned above mixing zone 105 on motor housing 102 (e.g., rotatably mounted on the housing 102), and an attachment 108, such as a beater, whisk, or hook, may be removably mounted to mixer shaft 109. Attachment 108 may rotate within a bowl (not shown) in mixing zone 105 to beat, whisk, knead, etc. material within the bowl during operation of motor 112.

As noted above, motor 112 may be operable to rotate mixer shaft 109. Motor 112 may be a direct current (DC) motor in certain example embodiments, such as, e.g., a brushless DC (BLDC) motor. In alternative example embodiments, motor 112 may be an alternating current (AC) motor, such as, e.g., a permanent magnet synchronous motor (PMSM). Motor 112 may include a rotor and a stator. The stator may be mounted within motor housing 102 such that the stator is fixed relative to motor housing 102, and the rotor may be coupled to mixer shaft 109 via drivetrain 110. A current through windings within the stator may generate a magnetic field that induces rotation of the rotor, e.g., due to magnets or a magnetic field via coils on the stator. The rotor may rotate at a relatively high rotational velocity and relatively low torque. Thus, drivetrain 110 may be configured to provide a rotational speed reduction and mechanical advantage between motor 112 and mixer shaft 109.

Stand mixer 100 may include a controller 122 provided within casing 101. For example, controller 122 may be located within motor housing 102 of casing 101. Controller 122 may be a microcontroller, as would be understood, including one or more processing devices, memory devices, or controllers. Controller 122 may include a plurality of electrical components configured to permit operation of stand mixer 100 and various components therein (e.g., motor 112). For instance, controller 122 may be on a printed circuit board (PCB), as would be well known. Furthermore, as will be discussed in greater detail with respect to FIGS. 5A-5B, the controller 122 may be configured to implement a control scheme such as, e.g., a field-oriented control (FOC) scheme. One of ordinary skill in the art will understand that, despite focusing the description herein to FOC schemes, alternative control schemes (e.g., six-step control, direct torque control, etc.) can be implemented without deviating from the scope of the present disclosure.

As used herein, the terms "control board," "processing device," "computing device," "controller," or the like may generally refer to any suitable processing device, such as a general or special purpose microprocessor, a microcontroller, an integrated circuit, an application specific integrated circuit (ASIC), a digital signal processor (DSP), a field-programmable gate array (FPGA), a logic device, one or more central processing units (CPUs), a graphics processing units (GPUs), processing units performing other specialized calculations, semiconductor devices, etc. In addition, these "controllers" are not necessarily restricted to a single element but may include any suitable number, type, and configuration of processing devices integrated in any suitable manner to facilitate appliance operation. Alternatively, controller 122 may be constructed without using a microprocessor, e.g., using a combination of discrete analog and/or digital logic circuitry (such as switches, amplifiers, integrators, comparators, flip-flops, AND/OR gates, and the like) to perform control functionality instead of relying upon software.

Controller 122 may include, or be associated with, one or more memory elements or non-transitory computer-readable storage mediums, such as RAM, ROM, EEPROM, EPROM, flash memory devices, magnetic disks, or other suitable memory devices (including combinations thereof). These memory devices may be a separate component from the processor or may be included onboard within the processor. In addition, these memory devices can store information and/or data accessible by the one or more processors, including instructions that can be executed by the one or more processors. It should be appreciated that the instructions can be software written in any suitable programming language or can be implemented in hardware. Additionally, or alternatively, the instructions can be executed logically and/or virtually using separate threads on one or more processors.

Figure 2:
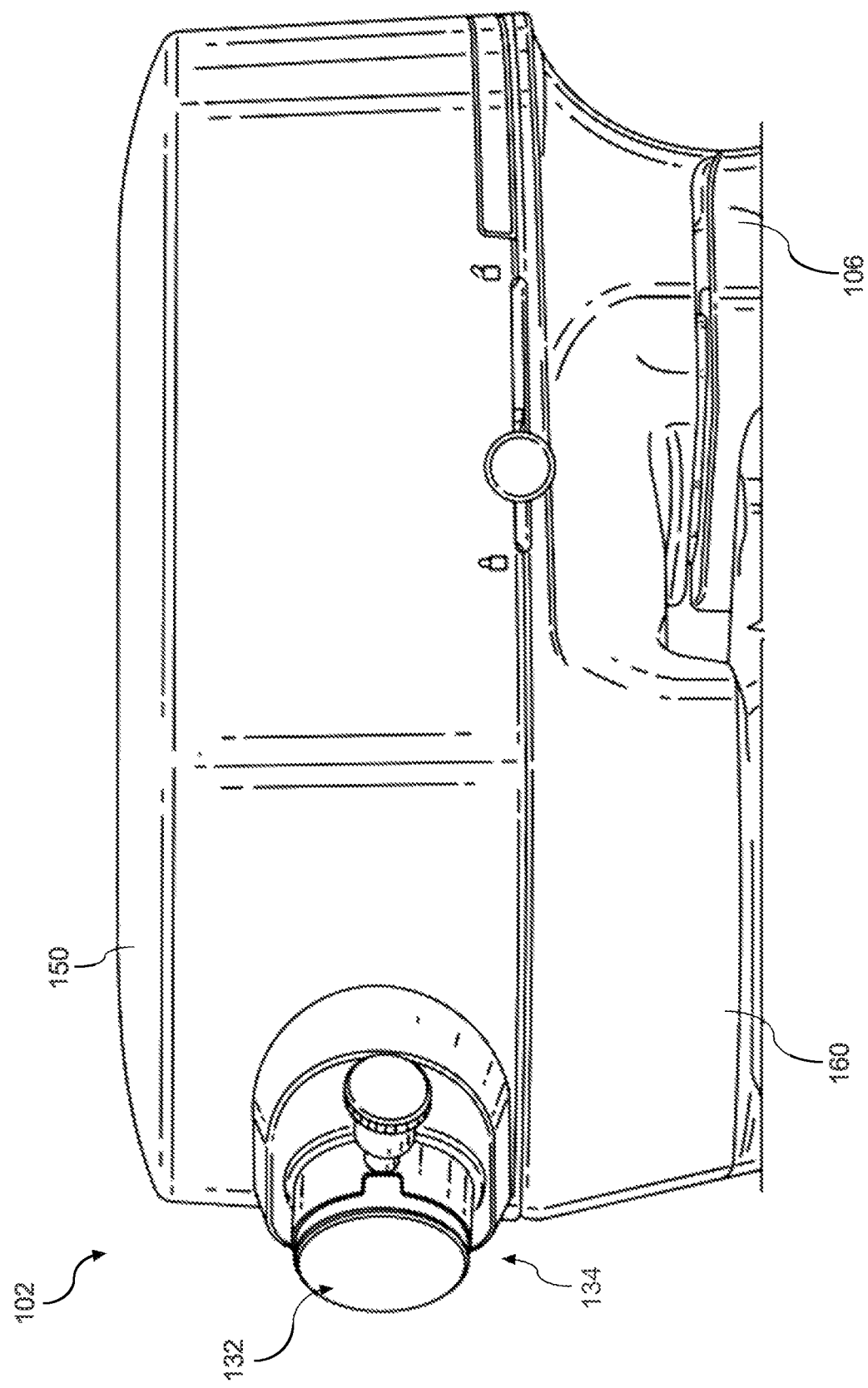
FIG. 2 depicts a perspective view of a motor housing of the example stand mixer of FIG. 1 according to example embodiments of the present disclosure.

FIG. 2 illustrates a perspective view of motor housing 102. As shown, motor housing 102 may include a first portion 150 and a second portion 160. Thus, e.g., motor housing 102 may include a two-piece structure that collectively forms motor housing 102. Moreover, first portion 150 may couple to second portion 160 to form motor housing 102. Second portion 160 may be mounted, e.g., pivotally, to column 106. As stated above, an opening 132 for a horizontal output shaft 130 (FIG. 3) may be defined by motor housing 102. Opening 132 may be positioned on a front portion 134 of motor housing 102 for easy access for an operator.

Figure 3:
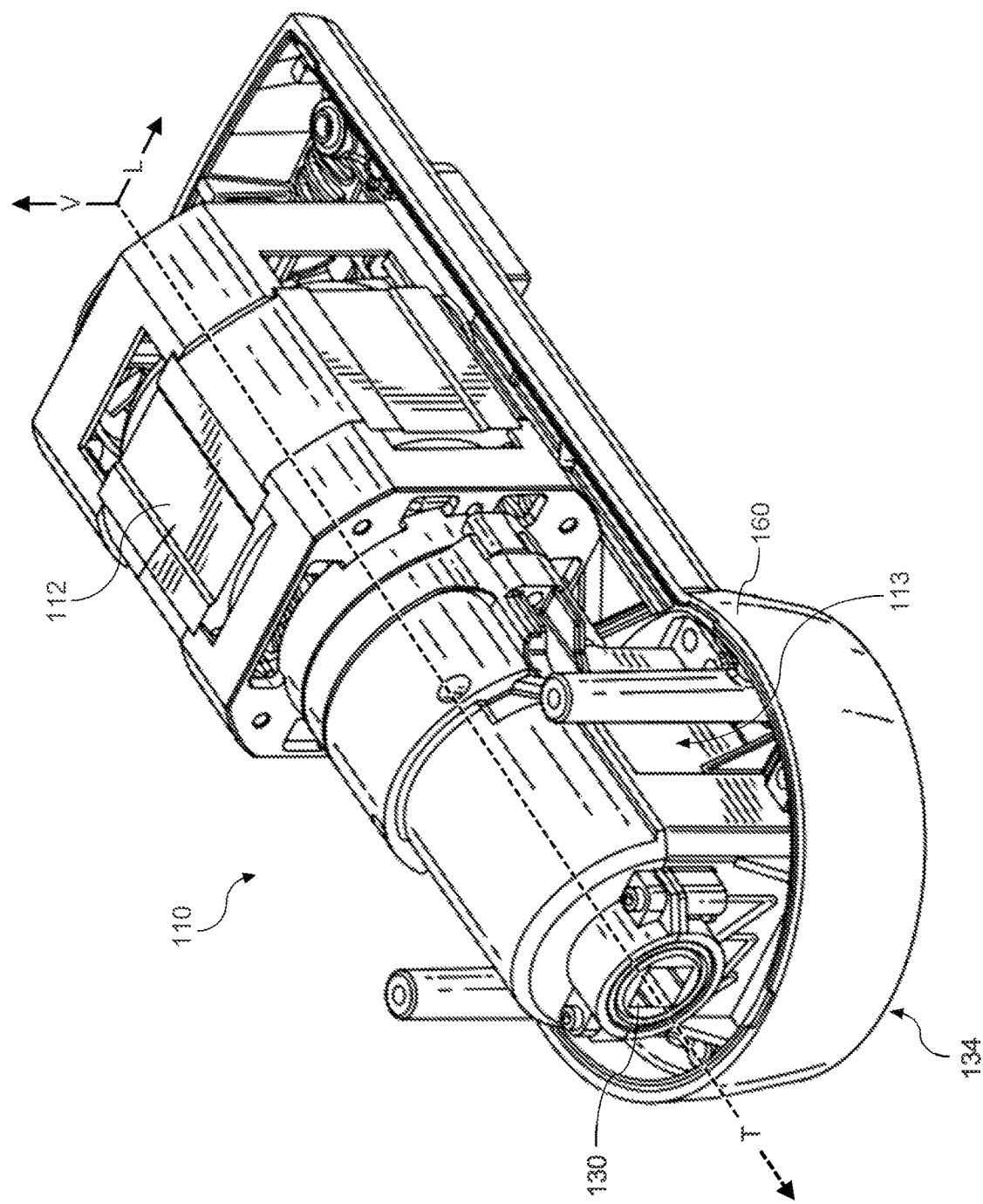
FIG. 3 depicts a perspective view of a motor in the motor housing of FIG. 2 according to example embodiments of the present disclosure.

FIG. 3 illustrates the second portion 160 of motor housing 102 with motor 112 and a motor assembly 113 shown. Motor assembly 113 may include components of drivetrain 110, e.g., planetary gearbox 114, bevel gearbox 116, and horizontal output shaft 130. Motor assembly 113 may be mounted within second portion 160 such that the axis of rotation of the motor is axially aligned with the transverse direction T. Additionally, motor assembly 113 may be mounted within second portion 160 such that horizontal output shaft 130 is positioned proximate front portion 134.

For instance, synchronous-type motors (e.g., motor 112) may be driven by field-oriented control (FOC) scheme, which provides for efficient and high-fidelity control. In field-oriented control, a stator magnetic field is generated via a stator current provided through one or more stator windings at the stator. The stator field is oriented at a fixed angular offset ahead of a rotor magnetic field at the rotor. For instance, the rotor field may be produced by one or more permanent magnets or other permanent magnetic poles at the rotor. The angular offset between the rotor field and the stator field induces rotational motion at the rotor as the rotor field tries to align itself with the stator field. By continually moving the stator field (e.g., per phases of the stator current), the rotor is made to synchronously rotate with the stator field.

Figure 4:
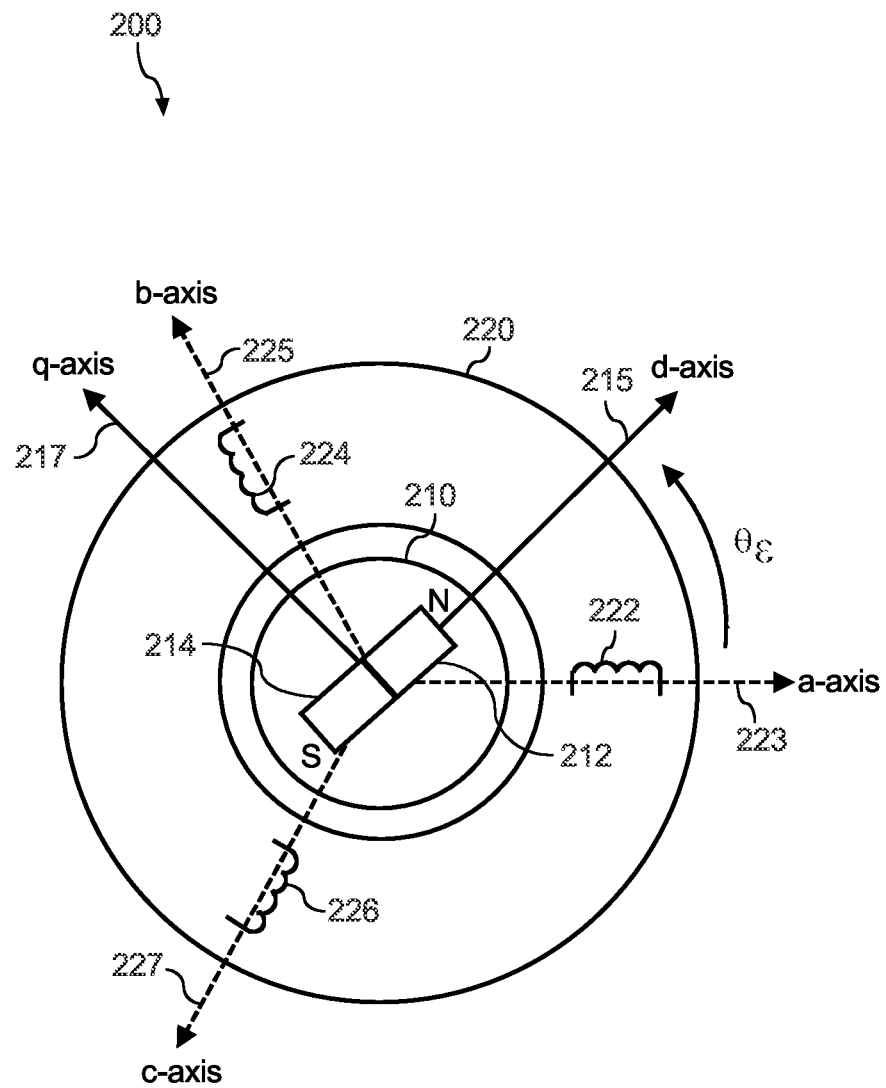
FIG. 4 depicts a schematic diagram of an example synchronous motor according to example embodiments of the present disclosure.

FIG. 4 depicts a schematic diagram of an example synchronous-type (e.g., salient) motor 200 according to example embodiments of the present disclosure. As illustrated, motor 200 includes rotor 210 and stator 220. Rotor 210 includes a north magnetic pole 212 and south magnetic pole 214. It should be understood that rotor 210 is discussed with reference to a single north magnetic pole 212 and a single south magnetic pole 214 for the purposes of illustration. Rotor 210 can include any suitable (e.g., balanced) number of north and south magnetic poles. The angle of the rotor magnetic field, represented by $\theta_e$, is related to a mechanical angle of the rotor, represented by $\theta_m$, by a number of rotor poles P. In particular, the angles are related by the equation:

$$\theta_e = \frac{P}{2}\theta_m.$$

In addition, the (mechanical) rotor speed, represented by $$\omega_m = \frac{d\theta_m}{dt},$$

can be related to the electrical rotor speed, represented by $$\omega_e = \frac{d\theta_e}{dt},$$

by the equation:

$$\omega_e = \frac{P}{2}\omega_m.$$

In operating the motor 200, three-phase power (e.g., current/voltage signals) can be provided at each of the stator windings 222, 224, and 226. For instance, stator winding 222 can be positioned along a-axis 223. Stator winding 224 can be positioned along b-axis 225 and can receive a power signal that is 120 degrees out of phase with the signal of stator winding 222. Additionally, stator winding 226 can be positioned along c-axis 227 and can receive a power signal that is −120 degrees or 240 degrees out of phase with stator winding 222.

A convenient way to represent the behavior of the motor 200 is to treat the three-phase voltages and currents as rotating space vectors. The rotating space vectors can be broken up into cartesian components. A first component, termed the direct component or D component, can be in phase with the rotor magnetic field. This component is directed along the d-axis 215. A second component, termed the quadrature component or Q component, can be out of phase with the direct component, such as 90 degrees out of phase with the direct component. For instance, this component can be directed along the q-axis 217.

In particular, voltages and currents in the rotating-space dq reference frame can be translated from the three-phase abc reference frame by suitable transforms. For instance, one example set of transforms, the Park Transform and Clarke Transform, can be performed in cascade to convert between rotating-space and three-phase. In particular, an example Park Transform is given by:

$$\begin{bmatrix} d \\ q \end{bmatrix} = \begin{bmatrix} \cos\theta_e & \sin\theta_e \\ -\sin\theta_e & \cos\theta_e \end{bmatrix} \begin{bmatrix} \alpha \\ \beta \end{bmatrix}$$

and an example Clarke Transform is given by:

$$\begin{bmatrix} \alpha \\ \beta \end{bmatrix} = \begin{bmatrix} \frac{2}{3} & -\frac{1}{3} & -\frac{1}{3} \\ 0 & \frac{1}{\sqrt{3}} & -\frac{1}{\sqrt{3}} \end{bmatrix} \begin{bmatrix} a \\ b \\ c \end{bmatrix}$$

Note that alternate versions of the above transformations exist, accounting for variations in the location of a zero reference angle, whether the transformation preserves amplitude or power, etc.

In the dq frame, the electrical dynamics of the stator windings can be given by:

$$\begin{bmatrix} v_d \\ v_q \end{bmatrix} = \begin{bmatrix} R_s & -\omega_e L_q \\ \omega_e L_d & R_s \end{bmatrix} \begin{bmatrix} I_d \\ I_q \end{bmatrix} + \begin{bmatrix} L_d & 0 \\ 0 & L_q \end{bmatrix} \begin{bmatrix} \dot{I}_d \\ \dot{I}_q \end{bmatrix} + \lambda_m \omega_e \begin{bmatrix} 0 \\ 1 \end{bmatrix}$$

where $R_s$ is the resistance of the stator windings; $L_d$, $L_q$ are the d and q axis inductances of the stator windings, which may differ from each other based on the rotor construction; and $\lambda_m$ is the magnitude of the rotor magnetic flux linkage, which can be constant for a sinusoidal motor. The voltage term $\lambda_m \omega_e$ is known as the back electromotive force (EMF) (or counter-electromotive force), and, as can be seen in the above equation, has magnitude proportional to the rotor electrical speed de. Because the magnitude of the back EMF is proportional to rotor speed, it is difficult to accurately estimate at low rotor speeds. Because of this, many existing observer algorithms may fail to accurately track the back EMF term at low speeds.

At least these reference frames can be used to design an observer. A general overview for observer design is given below. For instance, in an observer, estimates for the current derivative terms ($\dot{I}$), can be derived by solving the voltage equations for current derivative ($\dot{I}$), replacing unknown terms such as speed, flux, back EMF with estimates, and typically adding appropriate feedback error terms to stabilize the system. The resulting current derivative estimates ($\dot{\hat{I}}$) are then integrated to get current estimates ($\hat{I}$), which are then compared to the measured currents (I) to get error signals ($\tilde{I}$) to be used as feedback for updating observer estimates such as back EMF, flux, speed, angle, etc., as well as the current derivative estimates themselves. This algorithm can then be discretized for implementation in a digital controller. Additionally, other suitable observer designs can be employed according to example aspects of the present disclosure. One of ordinary skill in the art will understand that the term "error" can be used interchangeably with the term "difference" without deviating from the scope of the present disclosure.

The motor can be operated according to an operation cycle. Generally, the operation cycle can represent an operation plan of the motor over at least a period of time (and/or indefinitely). As one example, the operation cycle can define a plurality of target speeds, such as a sequence of target speeds, at which the motor is to be operated. The operation cycle may be implemented by speed control (e.g., matching actual speed of the motor to target speed) and/or by other suitable implementations, such as providing voltage and/or current signals relative to target voltage and/or current signals based at least in part on the operation cycle. The operation cycle can be software-based (e.g., stored in a memory of a controller of the motor) and/or hardware-based.

For instance, e.g., for synchronous motors with surface-mounted magnets, typically $L_d \cong L_q$. Those of ordinary skill in the art will understand that synchronous-type motors with surface-mounted magnets are known in the art as "Surface Permanent Magnet Synchronous Motors" ("SPMSMs"). Due to the equivalence between these inductances, differentiating the d-axis from the q-axis, which is used in identifying $\theta_e$, can require detecting the back EMF term. As a result, many observer algorithms depend on a minimum speed such that the observer can converge on a rotor speed and angle, or, intuitively, such that the magnitude of the back EMF term can become large enough to be significant. Furthermore, many observer algorithms can require the use of an open loop stage to bring the rotor above the minimum speed before employing closed loop feedback.

Alternatively, for synchronous motors with internally mounted magnets, typically $L_d < L_q$. Those of ordinary skill in the art will understand that synchronous-type motors with internally mounted magnets are known in the art as "Interior Permanent Magnet Synchronous Motors" ("IPMSMs"). IPMSMs have salient rotors, meaning the inductance of the stator windings will change relative to the orientation of the rotor. As a result, the difference in inductance (i.e., between $L_d$ and $L_q$) can be used to identify the orientation of the d-axis and the q-axis so long as the current is not at steady state. However, as will be discussed in greater detail below with respect to FIGS. 7-9, a high-frequency signal can be injected into the stator windings of the motor. In response to the high-frequency signal injection, the current in the stator windings will rise at a rate proportional to the inductance, such that:

$$\frac{dI}{dt} = \frac{V}{L}$$

Due to this difference in inductance in IPMSMs, if we apply a voltage pulse ($\Delta \vec{V}$) between the d-axis and the q-axis, $I_d$ will rise faster than $I_q$, resulting in a phase shift between $\Delta \vec{V}$ and $\Delta \vec{I}$. Conversely, no phase shift will result from a voltage pulse ($\Delta \vec{V}$) that is aligned to either the d-axis or the q-axis. Furthermore, superposition can be used to apply the voltage pulse ($\Delta \vec{V}$) on top of the voltage ($\vec{V}$) applied by the controller. Superposition can likewise be used to separate the current response ($\Delta \vec{I}$) from the total current ($\vec{I}$) applied by the controller. High-frequency signal injection operations are discussed in greater detail below with respect to FIGS. 5A-9.

In addition, many observers estimate the back EMF space vector and then align the dq frame by finding the angle $\theta_e$ which yields a zero back EMF term in the d-axis. If this back EMF vector is not accurately estimated, such as due to inaccuracies in model parameters, this inaccuracy can prevent the observer from accurately tracking rotor angle and speed. This issue can be especially prevalent at lower speeds, at which the back EMF vector has relatively lower magnitude compared to the terms with discrepancies.

According to example aspects of the present disclosure, however, an observer can estimate the rotor flux space vector, which is used to align the reference frame. The back EMF space vector is the derivative of the rotor flux space vector. Furthermore, example aspects of the present disclosure can include bounding the magnitude of the estimated rotor flux based on a nominal value. Furthermore, the back EMF vector can be based at least in part on the bounded estimated rotor flux. This can provide for improved robustness to voltage discrepancies. This, in turn, can provide for tracking rotor speed and/or angle to near-zero. For instance, the estimated rotor flux vectors can be multiplied by an estimated speed to obtain the back EMF signals.

In addition, the magnitude of the rotor flux vectors can be constrained such that the amplitude of the estimated back EMF can be tied to the estimated speed. This can prevent the estimated speed from increasing out of control when the real back EMF is small, but has uncertain orientation. This can provide that, even if the estimated rotor angle is not entirely accurate, the estimated rotor angle will not increase (or decrease) out of control either, and will thus experience relatively acceptable deviation at worst, especially in cases where the speed is only near zero temporarily, such as in the case of a motor direction change.

The observer according to example aspects of the present disclosure can be provided in an estimated rotating reference frame based on an estimated rotor angle. In this reference frame, the three-phase system states, such as current, voltage, and flux, can appear as two-phase DC signals, including a component in phase with the rotor flux angle (along what is termed the "direct axis" or the "d-axis") and a component which is orthogonal to it (along which is termed the "quadrature axis" or the "q-axis"). Representing these components as DC components can provide for improved case of tracking the components.

In some implementations, transforming signals (e.g., current measurements) from a three-phase reference frame to the estimated rotating reference frame comprises implementing a Park transform and a Clarke transform with respect to the estimated rotor angle. For instance, according to example aspects of the present disclosure, an estimated rotor angle $\hat{\theta}_e$ can be substituted in place of an actual rotor angle $\theta_e$ in the aforementioned Park Transform. This estimated rotor angle can be used in the absence of a known rotor angle. To differentiate from the earlier dq reference frame, the axes defined by this transformation are denoted as $\gamma\delta$, where the $\gamma$-axis is analogous to the d-axis and the $\delta$-axis is analogous to the q-axis. This transformation yields the following current dynamic model in an estimated rotating reference frame, the $\gamma\delta$ frame, where we assume that $L_d = L_q = L$:

$$\begin{bmatrix} v_\gamma \\ v_\delta \end{bmatrix} = \begin{bmatrix} R & -\dot{\hat{\theta}}_e L \\ \dot{\hat{\theta}}_e L & R \end{bmatrix} \begin{bmatrix} I_\gamma \\ I_\delta \end{bmatrix} + L \begin{bmatrix} \dot{I}_\gamma \\ \dot{I}_\delta \end{bmatrix} + \omega_e \begin{bmatrix} -\lambda_{r\delta} \\ \lambda_{r\gamma} \end{bmatrix}$$

where $\dot{\hat{\theta}}_e$ is the derivative of $\hat{\theta}_e$ and where the $\gamma\delta$ flux terms have the following form:

$$\begin{bmatrix} \lambda_{r\gamma} \\ \lambda_{r\delta} \end{bmatrix} = \lambda_m \begin{bmatrix} \cos \theta_e \\ \sin \theta_e \end{bmatrix}$$

where $\tilde{\theta}_e = \theta_e - \hat{\theta}_e$ is the angle error. As can be seen in the above equations, when $\hat{\theta}_e = \theta_e$, meaning that the estimated rotor angle is equivalent to the actual rotor angle, the model becomes equivalent to the earlier dq model, which means $\lambda_{r_\gamma} = \lambda_m$ and $\lambda_{r_\delta} = 0$.

Thus, according to example aspects of the present disclosure, the γδ reference frame can be useful in designing an observer that is configured to determine rotor speed and angle of a motor without requiring the use of speed or angle sensors. In particular, measured voltage and current can be used along with an estimated speed and rotor flux to estimate the rotating current vector. The estimated current vector can be compared with the measured current vector to produce a current error. This current error can then be used to update the estimated rotor flux. The estimated rotor flux can, in turn, be used to track rotor angle and/or rotor speed. For instance, the rotor flux vector can be designed to ideally have a zero magnitude at the q-axis, and, as such, the quadrature component of the rotor flux can be used as feedback to update the estimated speed and/or angle.

For instance, according to example aspects of the present disclosure, a controller can determine an initial estimated rotor angle. The initial estimated rotor angle can be determined in any suitable manner. For instance, as one example, the estimated rotor angle can be zero degrees and can be assigned upon initial energization of the motor.

The controller can additionally determine one or more estimated currents defined by an estimated rotating reference frame based at least in part on the estimated rotor angle. For instance, the γδ currents $\hat{I}_\gamma$, $\hat{I}_\delta$ can be determined in the estimated rotating reference frame, the γδ frame, based on the estimated rotor angle $\hat{\theta}_e$.

Additionally, the controller can obtain one or more current measurements of one or more measured currents respective to the one or more estimated currents. For instance, the actual currents can be measured from the motor and/or transformed to an appropriate reference frame. As one example, the measured currents may be measured by one or more current probes at the motor, such as at the stator windings and/or transformed by Park Transform and/or Clarke Transform.

Additionally, the controller can be configured to determine one or more current errors. For instance, the current errors can be determined by a subtractive combination of the one or more estimated currents and the one or more measured currents. As one example, the error signals can be determined by subtracting the one or more measured currents from the one or more actual currents. For instance, this is mathematically illustrated in the below equation, where $\tilde{I}_\gamma$ and $\tilde{I}_\delta$ are the current errors:

$$\tilde{I}_\gamma = \hat{I}_\gamma - I_\gamma$$

$$\tilde{I}_\delta = \hat{I}_\delta - I_\delta$$

The current estimates can be included in a closed-loop feedback system based at least in part on the one or more measured currents and the one or more current errors and based at least in part on a functional relationship between the one or more updated current estimates, the one or more measured currents, and one or more rotor flux estimates. For instance, in one example implementation according to example aspects of the present disclosure, the design of the estimated current is based on the following functional relationship(s):

$$\hat{I}_\gamma = \int \frac{1}{L_d} \left[ v_\gamma - R_s I_\gamma + \hat{\theta}_e (L_q I_\delta + \hat{\lambda}_{r_\delta}) - k_1 \tilde{I}_\gamma \right]$$

$$\hat{I}_\delta = \int \frac{1}{L_q} \left[ v_\delta - R_s I_\delta + \hat{\theta}_e (L_d I_\gamma + \hat{\lambda}_{r_\gamma}) - k_1 \tilde{I}_\delta \right]$$

where $k_1$ is a feedback gain, and $\hat{\lambda}_{r_\gamma}$, $\hat{\lambda}_{r_\delta}$ are rotor flux estimates. According to example aspects of the present disclosure, rotor flux estimates can be a useful component of observers, and, in particular at low speeds.

For instance, according to example aspects of the present disclosure, the controller can determine one or more rotor flux estimates based at least in part on the one or more current errors. For instance, the rotor flux estimates can be space vectors in the γδ reference frame, such as vectors including a γ-directed rotor flux vector, $\hat{\lambda}_{r_\gamma}$, and a δ-directed rotor flux vector, $\hat{\lambda}_{r_\delta}$. In some implementations, the rotor flux estimates can be modeled according to an integral over an additive combination of a first feedback-weighted current error of the current error(s) and the multiplicative combination of the estimated rotor angle and a second current error of the current error(s). The first current error and the second current error can be positioned with respect to differing axes of the γδ reference frame. For instance, in one example implementation, the rotor flux estimates can be defined as:

$$\hat{\lambda}_{r_\gamma} = \int \left[ k_1 \tilde{I}_\gamma + \hat{\theta}_e \tilde{I}_\delta \right]$$

$$\hat{\lambda}_{r_\delta} = \int \left[ k_1 \tilde{I}_\delta + \hat{\theta}_e \tilde{I}_\gamma \right]$$

Note that when the estimated rotor angle is equivalent to an actual rotor angle (e.g., $\hat{\theta}_e = \theta_e$) then the magnitude of the γ-directed rotor flux vector is equivalent to the magnitude of the rotor magnetic flux linkage (e.g., $\lambda_{r_\gamma} = \lambda_m$). Because of this, it is possible to set bounds on the integration of $\hat{\lambda}_{r_\gamma}$ to keep it near $\lambda_m$. Furthermore, when the estimated rotor angle and actual rotor angle are equivalent, the magnitude of the δ-directed rotor flux estimate should be zero. Because of this, it is possible to use the estimated δ-directed rotor flux vector, $\hat{\lambda}_{r_\delta}$ as a feedback term to update the estimated speed and angle.

For instance, the controller can additionally be configured to determine an estimated rotor speed, represented by $\omega_e$. For instance, in some implementations, the estimated rotor speed can be determined based at least in part on an integral of the estimated δ-directed rotor flux vector. The integral term can be weighted by a feedback gain. One example implementation of the integral is given by the equation below, where $\kappa_\omega$ is a feedback gain:

$$\hat{\omega}_e = \int k_\omega \hat{\lambda}_{r_\delta}$$

In addition, the controller can be configured to determine an updated estimated rotor angle of the rotor based at least in part on the estimated rotor speed. Additionally and/or alternatively, the updated estimated rotor angle of the rotor can be determined based at least in part on the one or more rotor flux estimates, such as the estimated δ-directed rotor flux vector. As one example, the updated estimated rotor angle of the rotor can be determined based at least in part on an integral of the sum of the estimated rotor speed and the estimated δ-directed rotor flux vector. The sum may be weighted based on one or more feedback gains. One example implementation of this integral is given below, where $k_\theta$ is a feedback gain, and wherein the term being integrated is the derivative of the estimated angle, $\dot{\hat{\theta}}_e$:

$$\hat{\theta}_e = \int \left[\hat{\omega}_e + k_\theta \hat{\lambda}_{r_\delta}\right]$$

The examples described above, and in particular the example rotor fluxes described above, are discussed with reference to the γδ reference frame as individual components projected onto each axis, (e.g., $\lambda_{r_\gamma}$, $\lambda_{r_\delta}$). This is referred to as a Cartesian representation. As an alternative, the rotor flux vector can be represented in Polar form, such as by splitting the rotor flux vector into a magnitude component and a phase component. For instance, the magnitude component can be the magnitude of the rotor magnetic flux linkage, represented by $\lambda_m$. Additionally and/or alternatively, the phase component can be represented by the angle error $\tilde{\theta}_e$. These representations can have a relationship with the Cartesian components that is given by standard Polar transforms. For instance, as given below:

$$\begin{bmatrix}\lambda_{r_\gamma}\\\lambda_{r_\delta}\end{bmatrix} = \lambda_m \begin{bmatrix}\cos\tilde{\theta}_e\\\sin\tilde{\theta}_e\end{bmatrix}$$

Thus, the observer may instead be designed to estimate the rotor magnetic flux linkage and angle error in place of the estimated rotor fluxes in the Cartesian representation. As an example, in some implementations, the magnitude of the estimated rotor flux may be based at least in part on the one or more current errors in the γδ reference frame and the estimated rotor angle. For instance, one example implementation of Polar estimated rotor flux vectors is given by the below equations:

$$\hat{\lambda}_m = \int \left[\cos\hat{\tilde{\theta}}_e\left(k_I \tilde{I}_\gamma + k_\lambda \dot{\hat{\theta}}_e \tilde{I}_\delta\right) + \sin\hat{\tilde{\theta}}_e\left(k_I \tilde{I}_\delta - k_\lambda \dot{\hat{\theta}}_e \tilde{I}_\gamma\right)\right]$$

$$\hat{\tilde{\theta}}_e = \int \left[\frac{1}{\hat{\lambda}_m}\left(\cos\hat{\tilde{\theta}}_e\left(k_I \tilde{I}_\delta - k_\lambda \dot{\hat{\theta}}_e \tilde{I}_\gamma\right) - \sin\hat{\tilde{\theta}}_e\left(k_I \tilde{I}_\gamma + k_\lambda \dot{\hat{\theta}}_e \tilde{I}_\delta\right)\right)\right]$$

where $\hat{\lambda}_m$ is an estimated rotor flux magnitude component and $\hat{\tilde{\theta}}_e$ is an estimated rotor flux phase component and/or an estimated rotor angle error.

Additionally, the controller can estimate the rotor speed and rotor angle based on the Polar estimated rotor flux vectors. As one example, the estimated rotor speed can be based at least in part on an integral of the estimated rotor angle error. Additionally and/or alternatively, the rotor angle can be based at least in part on an integral of an additive combination of the estimated rotor speed and the estimated rotor angle error. One example implementation of these integrals is given below:

$$\hat{\omega}_e = \int k_\omega \hat{\tilde{\theta}}_e$$

$$\hat{\theta}_e = \int \left[\hat{\omega}_e + k_\theta \hat{\tilde{\theta}}_e\right]$$

In some implementations, designing the observer in Polar form can be useful in separately tuning a convergence rate of the magnitude component (e.g., the rotor magnetic flux linkage) and the phase component (e.g., the angle error). For instance, in some implementations, it may be desirable to have a lower convergence rate of the magnitude component than the phase component such that the phase component converges faster than the magnitude component (e.g., if the magnitude component is ideally a constant value).

Figure 5A:
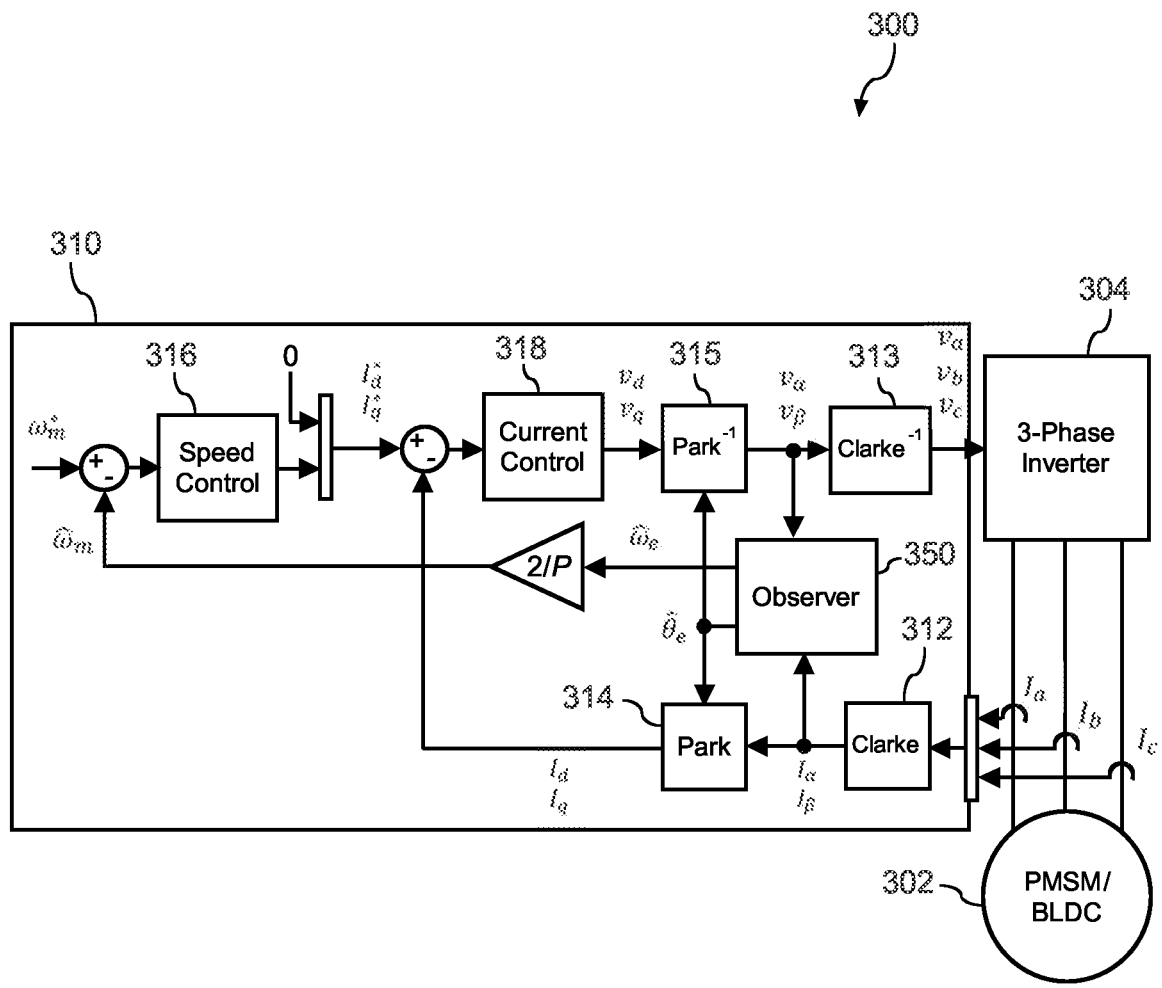
FIG. 5A depicts a block diagram of an example implementation of a motor assembly operating in a field-oriented control (FOC) scheme according to example embodiments of the present disclosure.

For instance, FIG. 5A depicts a block diagram of an example implementation of a motor assembly 300 operating in a dual-loop field-oriented control (FOC) scheme according to example embodiments of the present disclosure. As will be discussed in greater detail below, the FOC scheme can be configured to convert a three-phase signal (e.g., current/voltage) associated with the motor drive (e.g., three-phase inverter 304) into a two-phase signal. Furthermore, the motor assembly 300 shown in FIG. 5A can implement an observer algorithm according to example embodiments of the present disclosure. The motor assembly 300 can include a motor 302. The motor 302 can include any synchronous-type motor (e.g., salient motor) such as, e.g., a permanent magnet synchronous motor (PMSM) or a brushless DC (BLDC) motor. For instance, in some implementations, the motor 302 can be an Interior Permanent Magnet Synchronous Motor ("IPMSM"). As noted above, certain operations such as, e.g., high-frequency signal injection, can be used to determine an orientation of the rotor in IPMSM motors. As will be discussed in greater detail below, inductance differences in salient motors (i.e., $L_d < L_q$) can be used to identify the d-axis and the q-axis (e.g., orientation of the rotor) so long as the current is not at steady state.

The motor 302 can be driven by a reversible three-phase motor drive, which can include the three-phase inverter 304 and a power supply (not shown). The motor drive (e.g., inverter 304 and the power supply) can be operably coupled to a controller 310. The inverter 304 can likewise be operably coupled to the power supply and configured to control motor 302. For instance, inverter 304 can supply current signals to windings at motor 302 such that the motor 302 produces rotational motion. As one example, the inverter 304 can supply three-phase current signals $I_a$, $I_b$, and $I_c$ to stator windings at the motor 302 in synchronous timing such that a (e.g., permanent magnet) rotor at motor 302 rotates. The inverter 304 can produce the current signals in response to a control signal from the controller 310 (e.g., current controller 318). The controller 310 can be configured to control the inverter 304 and provide a current to one or more stators of the motor 302 to induce a stator magnetic field. In this way, the controller 310 can control an orientation of the stator magnetic field.

In addition, the motor assembly 300 can include a sensorless feedback system configured to obtain feedback measurements of one or more electrical characteristics from the motor 302. For instance, the motor assembly 300 can include an observer 350 configured to implement an observer algorithm. In some embodiments, the observer 350 can be a back-EMF observer configured to process one or more feedback measurements of one or more electrical characteristics of the motor and to provide data indicative of a position or a speed of the motor 302. As used herein, a "sensorless" feedback system is operable to determine data indicative of a position and/or a speed of the motor without a position sensor or a speed sensor. It should be noted that example aspects of the present disclosure are not limited to back-EMF observers. In fact, those of ordinary skill in the art will understand example aspects of the present disclosure can be implemented by any suitable observer without deviating from the scope of the present disclosure. For instance, example aspects of the present disclosure can be implemented using observers that are not capable of closed-loop startup from standstill speeds (e.g., approximately zero RPMs).

An example observer 350 implementing an example observer algorithm is discussed with reference to FIG. 5B. The observer 350 may implement the observer algorithm in a different reference frame than the three-phase reference frame of motor 302 and/or inverter 304. For instance, the current signals from the inverter 304 can be transformed by Clarke transform 312 and/or Park transform 314 into a rotating reference frame (e.g., an estimated rotating reference frame). For instance, the current signals can be transformed into an alpha-beta reference frame by the Clarke transform 312, and the signals from Clarke transform 312 can be used by the observer 350 to produce an estimated angle. The estimated angle can be used in Park transform 314 to produce signals in an estimated rotating reference frame.

The observer 350 can additionally produce an estimated speed. The estimated speed can be compared to a target speed to determine a speed difference (e.g., a speed error). The speed difference can be provided to speed control 316 to determine target current signals. The target current signals can be produced in the rotating reference frame. The target current signals can be compared to the measured current signals (e.g., from Park transform 314) to determine current difference signals (e.g., current error signals). The current difference signals can be used by current controller 318 to produce control signals for inverter 304. For instance, the control signals can be voltage signals. The voltage signals may be in the rotating reference frame. Furthermore, voltage signals used in the high-frequency signal injection operations (discussed in greater detail below) can be added to the output of the current controller 318. The voltage signals can be transformed (e.g., by inverse Park transform 315 and inverse Clarke transform 313) to the three-phase reference frame to be used by inverter 304.

Figure 5B:
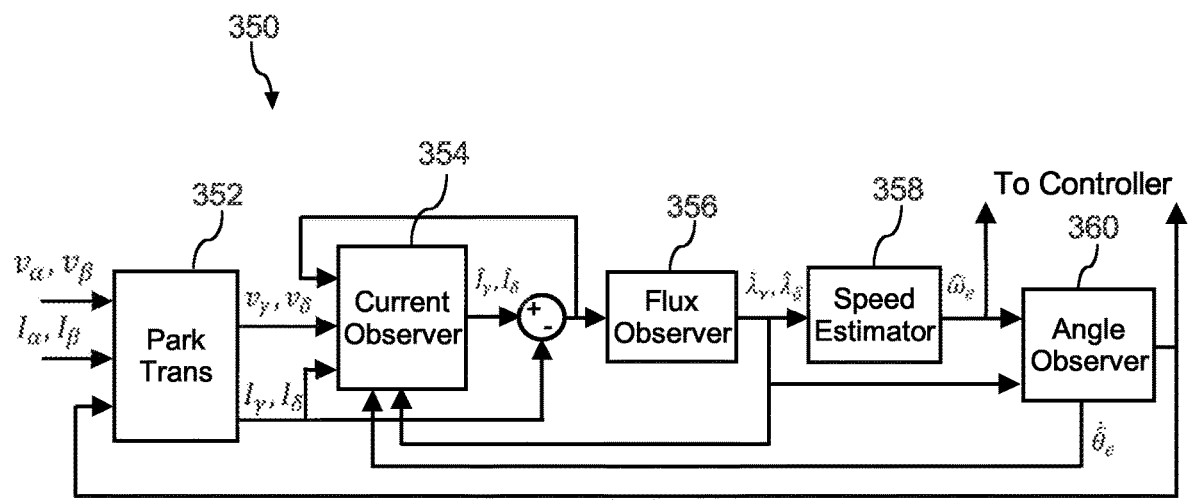
FIG. 5B depicts a block diagram of an example embodiment of an observer algorithm (e.g., from the motor assembly of FIG. 5A) according to example embodiments of the present disclosure.

FIG. 5B depicts a block diagram of an example implementation of an observer 350 implementing an observer algorithm (e.g., from the motor assembly 300 of FIG. 5A) according to example embodiments of the present disclosure. For instance, the observer 350 can receive voltage signals and/or current signals in the alpha-beta reference frame. The observer 350 can include Park transform 352 that can transform the signals in the alpha-beta reference frame to the estimated rotating reference frame based at least in part on the estimated angle from the observer 350. The current observer 354 can produce estimated currents in the estimated rotating reference frame. For instance, the current observer 354 can produce the estimated currents based at least in part on the measured currents in the estimated rotating reference frame, rotor flux estimates, and/or a derivative of the estimated angle. For instance, each of these values can be provided as feedback to the current observer 354.

The estimated currents produced by the current observer 354 can be subtractively combined with the actual currents from the Park transform 352 to produce current differences. The current differences can be provided to flux observer 356. The flux observer 356 can produce rotor flux estimates based at least in part on the current differences, as described herein. The rotor flux estimates can be used as feedback at current observer 354. Additionally, the rotor flux estimates can be provided to speed estimator 358. The speed estimator 358 can produce an estimated speed of the rotor based at least in part on the rotor flux estimates. The rotor flux estimates and/or the estimated rotor speed can be provided to angle observer 360. The angle observer 360 can determine an updated estimated rotor angle of the rotor based at least in part on the estimated rotor speed and/or the rotor flux estimates.

Referring again to FIG. 5A, it should be understood that some or all of these components may be implemented by a controller 310. For instance, in some embodiments, the controller 310 may be a computing device (e.g., including one or more processors) that is configured to implement the observer algorithm and/or various other operations described in FIGS. 5A-5B (e.g., Clarke transform 312, inverse Clarke transform 313, Park transform 314, inverse Park transform 315, observer 350, etc.). Additionally and/or alternatively, any of the operations (e.g., observer 350) may be implemented by discrete circuitry (e.g., analog circuitry) such as a programmable logic gate array, integrated circuit(s), or other suitable circuitry.

Systems and methods according to example aspects of the present disclosure can provide for a number of technical effects and benefits. As one example, system and methods according to example aspects of the present disclosure can provide improved tracking of rotor speed and/or angle, especially at around zero speed (e.g., zero RPM). For instance, improvements discovered in one example implementation are discussed in greater detail with respect to FIG. 6. This improved tracking can at least contribute to improved precision and/or capability of control systems for motor assemblies. Additionally, and especially compared to sensored methods, systems and methods according to example aspects of the present disclosure can provide for reduced cost and/or improved reliability associated with motor assemblies. For instance, by estimating rotor speed and/or angle, it is possible to omit rotor speed sensors and/or rotor angle sensors, saving costs associated with the sensors and/or reducing a likelihood of failure or inaccuracies associated with the sensors.

Additionally, systems and methods according to example aspects of the present disclosure can provide for improved solutions to various problems associated with limited near-zero-speed tracking of many existing observer algorithms. As one example, changing directions of a motor under existing observer algorithms can require braking to zero speed without observer feedback, due to the inability of existing algorithms to track speed to zero. As one example, this can be done by shorting stator windings. In this approach, it is not possible to control the rate of deceleration. Additionally, if it is necessary to identify the angle of the rotor, such as to start against a load, there is a conventional lack of reliable feedback to ensure that the rotor is at standstill, which is typically necessary to identify the angle of the rotor (e.g., by pulsed inductance test). Finally, to restart the motor, it would then be necessary to apply an open loop stage to bring the rotor up to a sufficient speed for the existing observer algorithms to converge. This typically requires greater currents and thereby increased power usage relative to closed-loop feedback mechanisms (e.g., sensorless feedback systems). For instance, these added steps can require increased time, current, audible noise (e.g., during angle detection stage), inconsistent low speed braking between loads, increased chance of stalling (e.g., during the open loop step) and various other challenges.

Systems and methods according to aspects of the present disclosure, however, can solve these challenges by providing reliable tracking of rotor speed and/or angle at zero and/or as the rotor passes through zero (e.g., to change directions). As another example, systems and methods according to aspects of the present disclosure can newly provide for consistent closed-loop feedback while switching directions of a motor.

Figure 6:
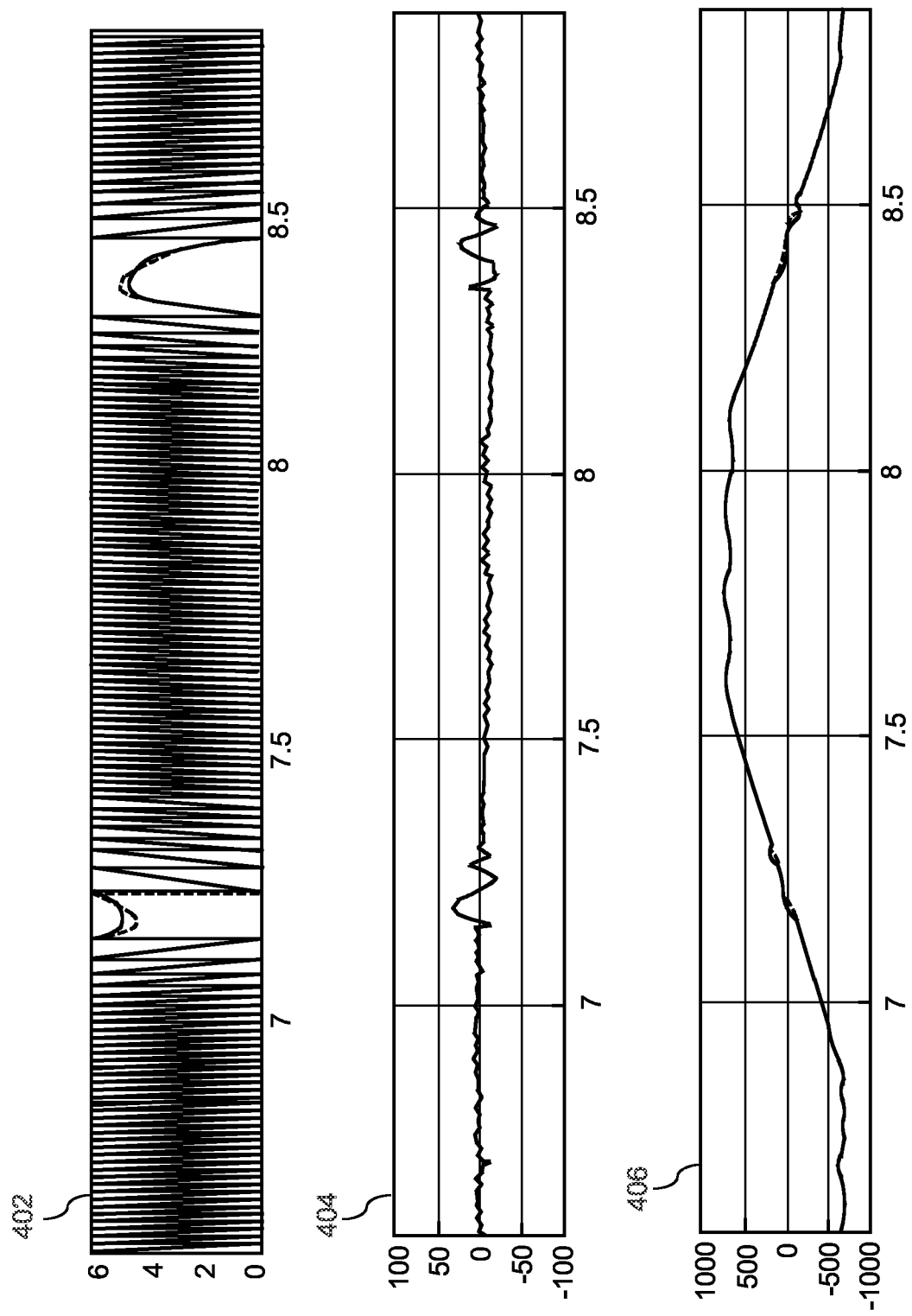
FIG. 6 depicts correlated plots of testing results of a sensorless closed loop control using an observer algorithm (e.g., from the motor assembly of FIGS. 5A-5B) according to example embodiments of the present disclosure.

FIG. 6 depicts correlated plots of testing results of a sensorless closed loop control using an observer algorithm according to example embodiments of the present disclosure. In particular, FIG. 6 illustrates how the observer angle and speed compare with those measured by an encoder. For instance, plot 402 depicts a comparison between an actual phase angle and an estimated phase angle from an observer algorithm according to example aspects of the present disclosure. Furthermore, plot 404 depicts a plot of the observer error. Additionally, plot 406 depicts a comparison between an actual rotor speed and an estimated speed from the observer. As illustrated, it can be seen that the observer is able to track the speed as it passes through zero without deviating significantly from the actual speed. Additionally, it can be seen that the observer angle deviates somewhat as speed passes through zero, but the deviation is small enough such that the control loop is not destabilized, especially if the speed merely passes through zero temporarily and does not linger for a significant period of time around zero.

Figure 7:
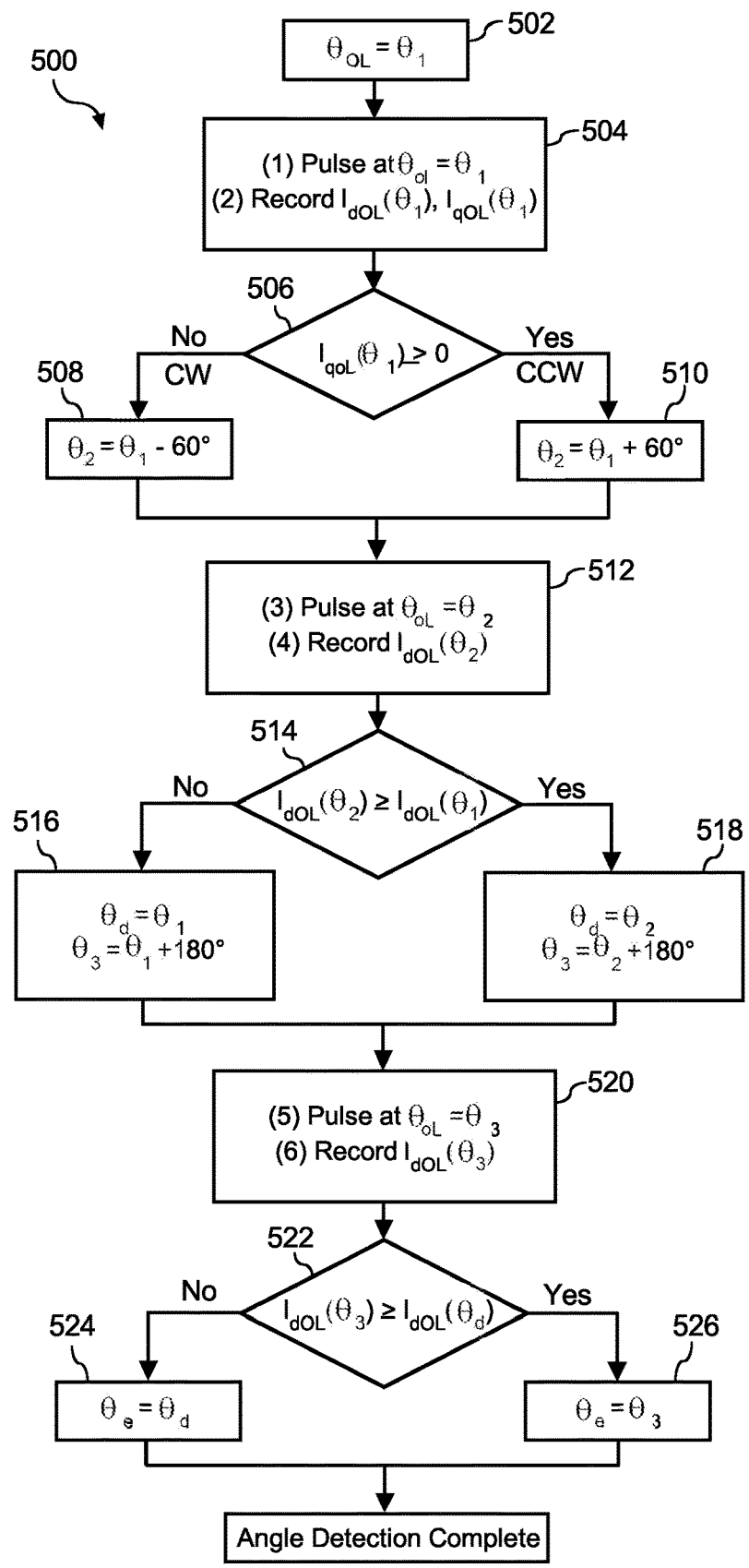
FIG. 7 depicts a flow diagram of an example method for operating a salient motor according to example embodiments of the present disclosure.

FIG. 7 depicts a flow diagram of an example method 500 for operating a salient motor according to example embodiments of the present disclosure. More particularly, the method 500 can be implemented as a standstill rotor angle detection operation in a field-oriented control (FOC) scheme (e.g., as depicted in FIGS. 5A-5B) implemented in an appliance. FIG. 7 depicts steps performed in a particular order for purposes of illustration and discussion. Those of ordinary skill in the art, using the disclosures provided herein, will understand that various steps of any of the methods described herein can be omitted, expanded, performed simultaneously, rearranged, and/or modified in various ways without deviating from the scope of the present disclosure. Furthermore, various steps (not illustrated) can be performed without deviating from the scope of the present disclosure. Additionally, method 500 is generally discussed with reference to the stand mixer 100 described above with reference to FIGS. 1-3, the motor 200 described above with reference to FIG. 4, and the motor assembly 300 described above with reference to FIGS. 5A-5B. However, it should be understood that aspects of the present method 500 can find application with any suitable appliance, motor assembly, motor, and/or observer.

The method 500 can include, at (502), determining a first estimated injection angle of a series of estimated injection angles. More particularly, a controller (e.g., controller 310) of a motor (e.g., motor 302) can be configured to determine the first estimated injection angle (θ1). Those of ordinary skill in the art will understand that the first estimated injection angle can be determined in any suitable manner and set to any suitable value without deviating from the scope of the present disclosure.

The method 500 can include, at (504), injecting a first high-frequency signal into the motor. More particularly, the controller (e.g., controller 310) can be configured to provide a first high-frequency signal injection of a series of high-frequency signal injections by injecting a first high-frequency signal into the motor (e.g., motor 302) at the first estimated injection angle determined at (502). As discussed above, the motor can be a synchronous-type motor (e.g., salient motor) such as, e.g., a brushless direct current (BLDC) motor and/or a permanent magnet synchronous motor (PMSM). In some embodiments, the controller can be configured to inject the first high-frequency signal such as, e.g., a first high-frequency voltage signal, into a stator winding of the motor. Those of ordinary skill in the art will understand that an estimated d-axis and an estimated q-axis can be defined based at least in part on the first high-frequency signal injection at the first estimated injection angle. Furthermore, as will be discussed in greater detail below, the first high-frequency voltage signal can be one of a series of high-frequency voltage signals injected into the motor as part of the standstill rotor angle detection operation of method 500.

Responsive to the first high-frequency signal injection at (504), the method 500 can include, at (506), processing one or more signals associated with the first high-frequency signal injection. More particularly, the controller (e.g., controller 310) can be configured to process one or more signals such as, e.g., one or more current signals induced in the stator of the motor in response to the first high-frequency signal injection at (504). In some embodiments, the one or more signals associated with the first high-frequency signal injection can include a d-axis component and a q-axis component. For instance, the controller can be configured to process a d-axis current component ($I_{d_{OL}}(\theta_1)$) and a q-axis current component ($I_{q_{OL}}(\theta_1)$) associated with the first high-frequency signal injection.

As noted above, due to saliency effects of the motor associated with the first high-frequency signal injection, the q-axis current component ($I_{q_{OL}}(\theta_1)$) associated with the first high-frequency signal injection can be used by the controller to locate an actual d-axis of the rotor. More particularly, the sign (i.e., polarity) of the q-axis current component ($I_{q_{OL}}(\theta_1)$) associated with the first high-frequency signal injection can give an indication as to a relative difference between the actual rotor angle ($\theta_e$) and the driving angle ($\theta_{OL}$) determined at (502) (i.e., the first estimated injection angle ($\theta_1$)). For instance, when the q-axis current component ($I_{q_{OL}}(\theta_1)$) associated with the first high-frequency signal injection is negative, that is an indication that the actual d-axis is clockwise from the estimated d-axis defined by the first high-frequency signal injection. Conversely, when the q-axis current component ($I_{q_{OL}}(\theta_1)$) associated with the first high-frequency signal injection is positive, that is an indication that the actual d-axis is counterclockwise from the estimated d-axis defined by the first high-frequency signal injection. Additionally, when the q-axis current component ($I_{q_{OL}}(\theta_1)$) associated with the first high-frequency signal injection is zero, that is an indication that the estimated d-axis defined by the first high-frequency signal injection is aligned with either the actual d-axis or the actual q-axis of the motor.

The method 500 can include, at (508) and (510), determining a second estimated injection angle of the series of estimated injection angles based at least in part on the one or more signals associated with the first high-frequency signal injection. More particularly, the controller (e.g., controller 310) can be configured to determine the second estimated injection angle ($\theta_2$) based at least in part on the first estimated injection angle ($\theta_1$) and the q-axis current component ($I_{q_{OL}}(\theta_1)$) associated with the first high-frequency signal injection that was processed at (506).

For instance, as shown at (508), when the q-axis current component ($I_{q_{OL}}(\theta_1)$) associated with the first high-frequency signal injection is negative, the controller (e.g., controller 310) can determine that the second estimated injection angle ($\theta_2$) is clockwise from the first estimated injection angle ($\theta_1$). In some embodiments, the controller can be configured to determine that the second estimated injection angle ($\theta_2$) is sixty degrees in the clockwise direction (i.e., $\theta_2=\theta_1-60°$) From the first estimated injection angle ($\theta_1$). Those of ordinary skill in the art will understand that an angle greater than and/or less than sixty degrees can be used to determine the second estimated injection angle ($\theta_2$) without deviating from the scope of the present application.

Conversely, as shown at (510), when the q-axis current component ($I_{q_{OL}}(\theta_1)$) associated with the first high-frequency signal injection is positive, the controller (e.g., controller 310) can determine that the second estimated injection angle ($\theta_2$) is counterclockwise from the first estimated injection angle ($\theta_1$). In some embodiments, the controller can be configured to determine that the second estimated injection angle ($\theta_2$) is sixty degrees in the counterclockwise direction (i.e., $\theta_2=\theta_1+60°$) From the first estimated injection angle ($\theta_1$). Those of ordinary skill in the art will understand that an angle greater than and/or less than sixty degrees can be used to determine the second estimated injection angle ($\theta_2$) without deviating from the scope of the present application.

The method 500 can include, at (512), injecting a second high-frequency signal into the motor. More particularly, the controller (e.g., controller 310) can be configured to provide a second high-frequency signal injection of the series of high-frequency signal injections by injecting the second high-frequency signal into the motor (e.g., motor 302) at the second estimated injection angle determined at (508) and/or (510). In some embodiments, the controller can be configured to inject the second high-frequency signal into the motor in a similar manner as set forth above with respect to (504). Those of ordinary skill in the art will understand that the second high-frequency signal injection can be performed in any suitable manner without deviating from the scope of the present application.

Responsive to the second high-frequency signal injection at (512), the method 500 can include, at (514), processing one or more signals associated with the second high-frequency signal injection. More particularly, the controller (e.g., controller 310) can be configured to process one or more signals such as, e.g., one or more current signals induced in the stator of the motor (e.g., motor 302) in response to the second high-frequency signal injection at (512). In some embodiments, the one or more signals associated with the second high-frequency signal injection can include a d-axis component and a q-axis component. For instance, the controller can be configured to process a d-axis current component ($I_{d_{OL}}(\theta_2)$) and a q-axis current component ($I_{q_{OL}}(\theta_2)$) associated with the second high-frequency signal injection.

As noted above, due to the saliency effects of the motor, the d-axis current component ($I_{d_{OL}}(\theta_1)$) associated with the first high-frequency signal injection and the d-axis current component ($I_{d_{OL}}(\theta_2)$) associated with the second high-frequency signal injection can be used to further locate the actual d-axis of the rotor. More particularly, as noted above, because the inductance of the stator when the stator is out-of-phase with the rotor field ($L_q$) is typically greater than the inductance of the stator when the stator is aligned with the rotor field ($L_d$) (i.e., $L_d<L_q$), d-axis current ($I_d$) is induced more readily than q-axis current ($I_q$). Using these saliency principles, the d-axis current component ($I_{d_{OL}}(\theta_1)$) associated with the first high-frequency signal injection can be compared to the d-axis current component ($I_{d_{OL}}(\theta_2)$) associated with the second high-frequency signal injection to determine whether the first estimated injection angle ($\theta_1$) (e.g., determined at (502)) or the second estimated injection angle ($\theta_2$) (e.g., determined at (508) and/or (510)) is aligned with the actual d-axis of the rotor. For instance, when the d-axis current component ($I_{d_{OL}}(\theta_1)$) associated with the first high-frequency signal injection is greater than the d-axis current component ($I_{d_{OL}}(\theta_2)$) associated with the second high-frequency signal injection, that is an indication that the first estimated injection angle ($\theta_1$) is aligned with the actual d-axis of the rotor. Conversely, when the d-axis current component ($I_{d_{OL}}(\theta_2)$) associated with the second high-frequency signal injection is greater than (or equal to) the d-axis current component ($I_{d_{OL}}(\theta_1)$) associated with the first high-frequency signal injection, that is an indication that the second estimated injection angle ($\theta_2$) is aligned with the actual d-axis of the rotor.

The method 500 can include, at (516) and (518), determining a third estimated injection angle of the series of estimated injection angles based at least in part on the one or more signals associated with the first high-frequency signal injection and the one or more signals associated with the second high-frequency signal injection. More particularly, the controller (e.g., controller 310) can be configured to determine the third estimated injection angle ($\theta_3$) based at least in part on the first estimated injection angle ($\theta_1$) determined at (502), the d-axis current component ($I_{d_{OL}}(\theta_1)$) associated with the first high-frequency signal injection at (504), the second estimated injection angle ($\theta_2$) determined at (508) and/or (510), and the d-axis current component ($I_{d_{OL}}(\theta_2)$) associated with the second high-frequency signal injection at (512).

For instance, as shown at (516), when the d-axis current component ($I_{d_{OL}}(\theta_1)$) associated with the first high-frequency signal injection is greater than the d-axis current component ($I_{d_{OL}}(\theta_2)$) associated with the second high-frequency signal injection, the controller (e.g., controller 310) can determine that the first estimated injection angle ($\theta_1$) is aligned with the actual d-axis of the rotor (i.e., $\theta_d=\theta_1$). The controller can further determine that the third estimated injection angle ($\theta_3$) is 180° opposite the first estimated injection angle ($\theta_1$) (i.e., $\theta_3=\theta_1+180°$). Those of ordinary skill in the art will understand that any suitable angle can be used to determine the third estimated injection angle ($\theta_3$) without deviating from the scope of the present disclosure.

Conversely, as shown at (518), when the d-axis current component ($I_{d_{OL}}(\theta_2)$) associated with the second high-frequency signal injection is greater than (or equal to) the d-axis current component ($I_{d_{OL}}(\theta_1)$) associated with the first high-frequency signal injection, the controller (e.g., controller 310) can determine that the second estimated injection angle ($\theta_2$) is aligned with the actual d-axis of the rotor (i.e., $\theta_d=\theta_2$). The controller can further determine that the third estimated injection angle ($\theta_3$) is 180° opposite the second estimated injection angle ($\theta_2$) (i.e., $\theta_3=\theta_2+180°$). Those of ordinary skill in the art will understand that any suitable angle can be used to determine the third estimated injection angle ($\theta_3$) without deviating from the scope of the present disclosure.

The method 500 can include, at (520), injecting a third high-frequency signal into the motor. More particularly, the controller (e.g., controller 310) can be configured to provide a third high-frequency signal injection of the series of high-frequency signal injections by injecting the third high-frequency signal into the motor (e.g., motor 302) at the third estimated injection angle determined at (516) and/or (518). In some embodiments, the controller can be configured to inject the third high-frequency signal into the motor in a similar manner as set forth above with respect to (504) and (512). Those of ordinary skill in the art will understand that the third high-frequency signal injection can be performed in any suitable manner without deviating from the scope of the present application.

Responsive to the third high-frequency signal injection at (520), the method 500 can include, at (522), processing one or more signals associated with the third high-frequency signal injection. More particularly, the controller (e.g., controller 310) can be configured to process one or more signals such as, e.g., one or more current signals induced in the stator of the motor in response to the third high-frequency signal injection at (520). In some embodiments, the one or more signals associated with the third high-frequency signal injection can include a d-axis component and a q-axis component. For instance, the controller can be configured to process a d-axis current component ($I_{d_{OL}}(\theta_3)$) and a q-axis current component ($I_{q_{OL}}(\theta_3)$) associated with the third high-frequency signal injection.

As noted above, the saliency effects of the motor can be used to determine the location of the actual d-axis of the rotor. Similarly, due to the saturation effects of the motor, the d-axis current component ($I_{d_{OL}}(\theta_3)$) associated with the third high-frequency signal injection and the d-axis current component ($I_{d_{OL}}(\theta_d)$) associated with the high-frequency signal injection corresponding to the estimated injection angle aligned with the actual d-axis (i.e., determined at (516) and/or (518)) can be used to determine an orientation of the actual d-axis of the rotor. More particularly, because smaller d-axis inductance ($L_q$) results in a larger d-axis current ($I_d$) induced by the high-frequency signal injection, the d-axis current component ($I_{d_{OL}}(\theta_3)$) associated with the third high-frequency signal injection can be compared to the d-axis current component ($I_{d_{OL}}(\theta_d)$) associated with the high-frequency signal injection corresponding to the estimated injection angle aligned with the actual d-axis (i.e., determined at (516) and/or (518)) to determine which angle corresponds to the rotor field angle (De) of the motor.

The method 500 can include, at (524) and (526), determining one or more operating parameters via the controller based at least in part on the first high-frequency signal injection, the second high-frequency signal injection, and the third high-frequency signal injection. More particularly, the controller (e.g., controller 310) can be configured to determine the rotor field angle ($\theta_e$) of the motor (e.g., motor 302) based at least in part on the d-axis current component ($I_{d_{OL}}(\theta_1)$) associated with the first high-frequency signal injection at (504), the d-axis current component ($I_{d_{OL}}(\theta_2)$) associated with the second high-frequency signal injection at (512), and the d-axis current component ($I_{d_{OL}}(\theta_3)$) associated with the third high-frequency signal injection at (520). For instance, when the d-axis current component ($I_{d_{OL}}(\theta_d)$) associated with the high-frequency signal injection corresponding to the estimated injection angle aligned with the actual d-axis (i.e., determined at (516) and/or (518)) is greater than the d-axis current component ($I_{d_{OL}}(\theta_3)$) associated with the third high-frequency signal injection, that is an indication that the injection angle determined to be aligned with the actual d-axis ($\theta_d$) (i.e., determined at (516) and/or (518)) corresponds to the rotor field angle ($\theta_e$) of the motor. Conversely, when the d-axis current component ($I_{d_{OL}}(\theta_3)$) associated with the third high-frequency signal injection is greater than (or equal to) the d-axis current component ($I_{d_{OL}}(\theta_d)$) associated with the high-frequency signal injection corresponding to the estimated injection angle aligned with the actual d-axis (i.e., determined at (516) and/or (518)), that is an indication that the third estimated injection angle ($\theta_3$) corresponds to the rotor field angle ($\theta_e$) of the motor.

For instance, as shown at (524), when the d-axis current component ($I_{d_{OL}}(\theta_d)$) associated with the high-frequency signal injection corresponding to the estimated injection angle aligned with the actual d-axis (i.e., determined at (516) and/or (518)) is greater than the d-axis current component ($I_{d_{OL}}(\theta_3)$) associated with the third high-frequency signal injection, the controller (e.g., controller 310) can determine that the injection angle determined to be aligned with the actual d-axis ($\theta_d$) (i.e., determined at (516) and/or (518)) corresponds to the rotor field angle ($\theta_e$) of the motor (i.e., $\theta_e = \theta_d$).

Conversely, as shown at (526), when the d-axis current component ($I_{d_{OL}}(\theta_3)$) associated with the third high-frequency signal injection is greater than (or equal to) the d-axis current component ($I_{d_{OL}}(\theta_a)$) associated with the high-frequency signal injection corresponding to the estimated injection angle aligned with the actual d-axis (i.e., determined at (516) and/or (518)), the controller (e.g., controller 310) can determine that the third estimated injection angle ($\theta_3$) corresponds to the rotor field angle ($\theta_e$) of the motor (i.e., $\theta_e = \theta_3$).

Figure 8:
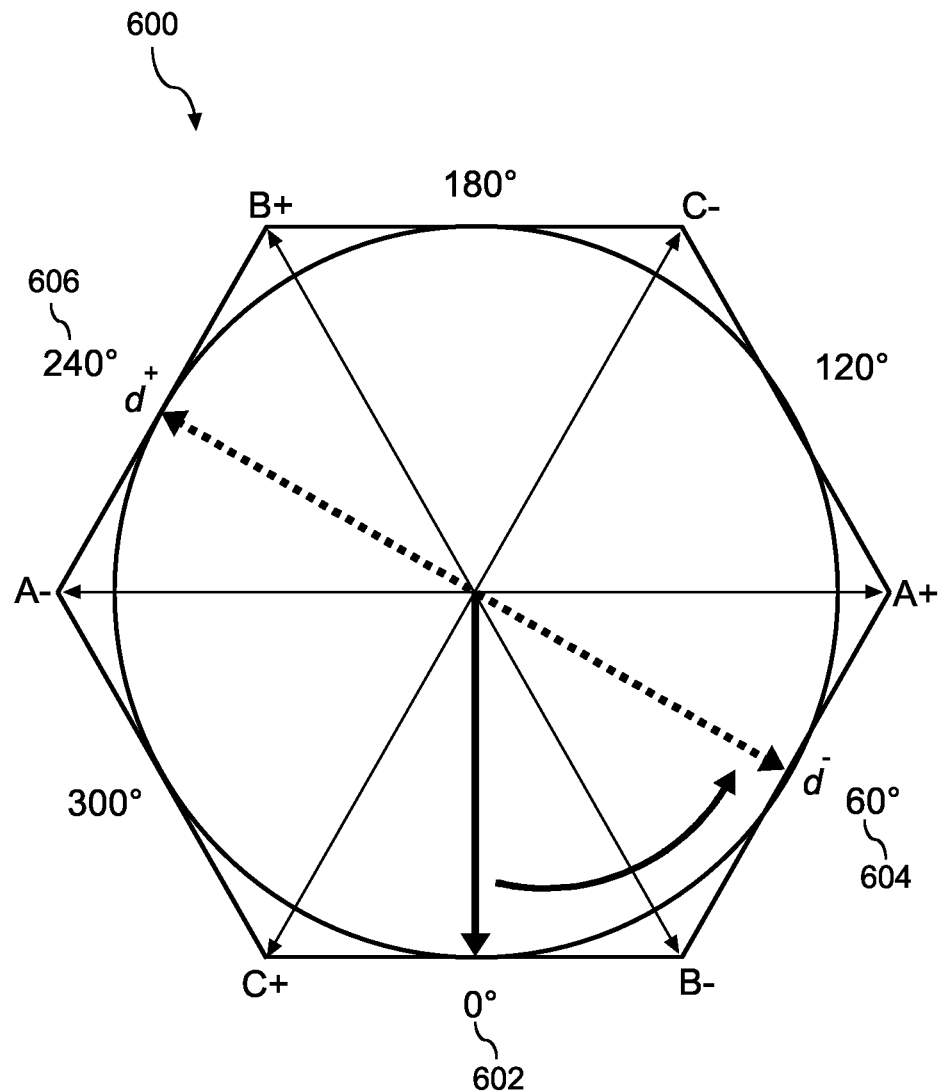
FIG. 8 depicts an illustrative implementation of the method depicted in FIG. 7 according to example embodiments of the present disclosure.

FIG. 8 depicts an illustrative example of the method 500 depicted in FIG. 7 according to example embodiments of the present disclosure. It should be understood that the estimated injection angles shown in FIG. 8 are for illustrative purposes only, and those of ordinary skill in the art will understand that any suitable angle can be used without deviating from the scope of the present disclosure. Furthermore, as shown in FIG. 8, a unit circle 600 can be divided into a discrete number of test angles (e.g., 0°, 60°, 120°, 180°, 240°, 300°). Those of ordinary skill in the art will understand that the unit circle 600 can be divided into as few, or as many, discrete number of test angles without deviating from the scope of the present disclosure.

Referring now to FIG. 8, a controller (e.g., controller 310) of a motor (e.g., motor 302) can be configured to determine a first estimated injection angle ($\theta_1$) 602. For instance, in the illustrative example depicted in FIG. 8, the controller can determine that the first estimated injection angle ($\theta_1$) 602 is 0°. The controller can be further configured to provide a first high-frequency signal injection by injecting a first high-frequency voltage signal into a stator winding of the motor at the first estimated injection angle ($\theta_1$) 602. The controller can then record a d-axis current component ($I_{d_{OL}}(\theta_1)$) and a q-axis current component ($I_{q_{OL}}(\theta_1)$) associated with the first high-frequency signal injection. As noted above, due to saliency effects of the motor, a sign (i.e., polarity) of the q-axis current component ($I_{q_{OL}}(\theta_1)$) associated with the first high-frequency signal injection can indicate a relative difference between an actual rotor angle ($\theta_e$) and the first estimated injection angle ($\theta_1$) 602.

As shown in FIG. 8, when the q-axis current component ($I_{q_{OL}}(\theta_1)$) associated with the first high-frequency signal injection is positive, the controller can determine that a second estimated injection angle ($\theta_2$) 604 is counterclockwise on the unit circle 600 with respect to the first estimated injection angle ($\theta_1$) 602. As such, the controller can determine that the second estimated injection angle ($\theta_2$) 604 is 60°. The controller can be further configured to provide a second high-frequency signal injection by injecting a second high-frequency voltage signal into the stator winding of the motor at the second estimated injection ($\theta_2$) 604. The controller can then record a d-axis current component ($I_{d_{OL}}(\theta_2)$) associated with the second high-frequency signal injection. As noted above, due to the saliency effects of the motor, the d-axis current component ($I_{d_{OL}}(\theta_1)$) associated with the first high-frequency signal injection can be compared to the d-axis current component ($I_{d_{OL}}(\theta_2)$) associated with the second high-frequency signal injection to determine whether the first estimated injection angle ($\theta_1$) 602 or the second estimated injection angle ($\theta_2$) 604 is aligned with the actual d-axis of the rotor.

As shown in FIG. 8, when the d-axis current component ($I_{d_{OL}}(\theta_2)$) associated with the second high-frequency signal injection is greater than the d-axis current component ($I_{d_{OL}}(\theta_1)$) associated with the first high-frequency signal injection, the controller can determine that the second estimated injection angle ($\theta_2$) 604 is aligned with the actual d-axis of the rotor. As shown, the controller can determine the actual rotor angle ($\theta_e$) by determining that a third estimated injection angle ($\theta_3$) 606 is 180° opposite the second estimated injection angle ($\theta_2$) 604. As such, the controller can determine that the third estimated injection angle ($\theta_3$) 606 is 240°. The controller can be further configured to provide a third high-frequency signal injection by injecting a third high-frequency voltage signal into the stator winding of the motor at the third estimated injection ($\theta_3$) 606. The controller can then record a d-axis current component ($I_{d_{OL}}(\theta_3)$) associated with the third high-frequency signal injection. As noted above, due to saturation effects of the motor, the d-axis current component ($I_{d_{OL}}(\theta_3)$) associated with the third high-frequency signal injection can be compared to the d-axis current component ($I_{d_{OL}}(\theta_2)$) associated with the second high-frequency signal injection to determine the actual rotor angle ($\theta_e$).

As shown in FIG. 8, when the d-axis current component ($I_{d_{OL}}(\theta_3)$) associated with the third high-frequency signal injection is greater than the d-axis current component ($I_{d_{OL}}(\theta_2)$) associated with the second high-frequency signal injection (i.e., the d-axis current component corresponding to the estimated injection angle determined to be in alignment with the d-axis), the controller can determine that the third estimated injection angle ($\theta_3$) 606 corresponds to the actual rotor angle ($\theta_e$).

Figure 9:
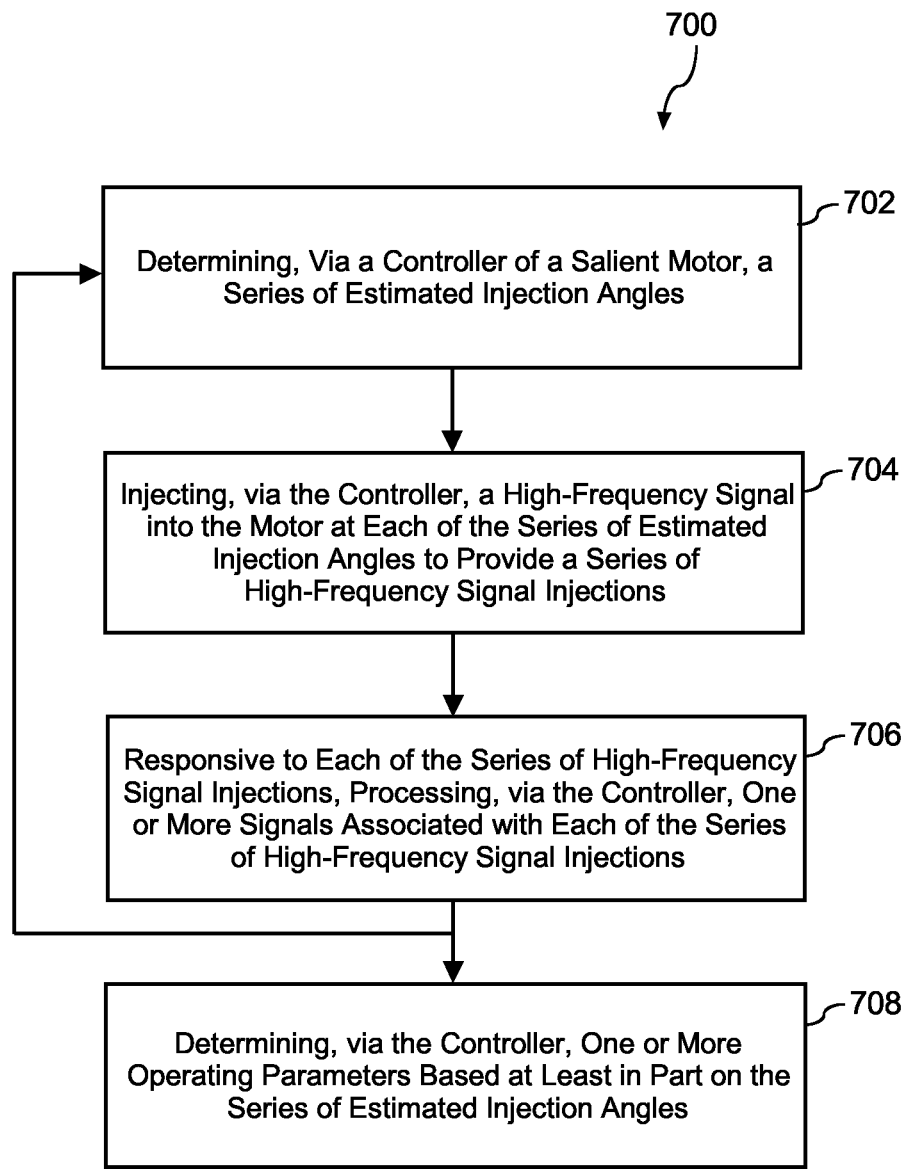
FIG. 9 depicts a flow diagram of an example method for operating a salient motor according to example embodiments of the present disclosure.

FIG. 9 depicts a flow diagram of an example method 700 for operating a salient motor according to example embodiments of the present disclosure. More particularly, method 700 can be implemented as a standstill rotor angle detection operation in a field-oriented (FOC) scheme (e.g., as depicted in FIGS. 5A-5B) implemented in an appliance. FIG. 9 depicts steps performed in a particular order for purposes of illustration and discussion. Those of ordinary skill in the art, using the disclosures provided herein, will understand that various steps of any of the methods described herein can be omitted, expanded, performed simultaneously, rearranged, and/or modified in various ways without deviating from the scope of the present disclosure. Furthermore, various steps (not illustrated) can be performed without deviating from the scope of the present disclosure. Additionally, method 700 is generally discussed with reference to the stand mixer 100 described above with reference to FIGS. 1-3, the motor 200 described above with reference to FIG. 4, and the motor assembly 300 described above with reference to FIGS. 5A-5B. However, it should be understood that aspects of the present method 700 can find application with any suitable appliance, motor assembly, motor, and/or observer.

The method 700 can include, at (702), determining a series of estimated injection angles via a controller of the motor. More particularly, a controller (e.g., controller 310) of the motor (e.g., motor 302) can be configured to determine a series of estimated injection angles. Those of ordinary skill in the art will understand that the series of estimated injection angles can be determined in any suitable manner and set to any suitable value without deviating from the scope of the present disclosure.

The method 700 can include, at (704), injecting a high-frequency signal into the motor at each of the series of estimated injection angles to provide a series of high-frequency signal injections via the controller. More particularly, the controller (e.g., controller 310) can be configured to inject a high-frequency signal into the motor (e.g., motor 302) at each of the series of estimated injection angles determined at (702). As discussed above, the motor can be a synchronous-type motor (e.g., salient motor) such as, e.g., a brushless direct current (BLDC) motor and/or a permanent magnet synchronous motor (PMSM). In some embodiments, the controller can be configured to inject the high-frequency signal such as, e.g., a high-frequency voltage signal, into a stator winding of the motor. As discussed above with respect to FIGS. 7 and 8, in some embodiments, the controller can be configured to inject a series of high-frequency signals into the motor. Those of ordinary skill in the art will understand that the high-frequency signal can be any suitable type of repeating pulse (e.g., a square wave, sinusoidal waveform, Gaussian pulse, triangle waveform, etc.) without deviating from the scope of the present disclosure. Moreover, the amplitude and/or frequency of the high-frequency signal are tunable.

Responsive to each of the series of high-frequency signal injections at (704), the method 700 can include, at (706), processing one or more signals associated with each of the series of high-frequency signal injections via the controller. More particularly, the controller (e.g., controller 310) can be configured to process one or more signals induced in the motor (e.g., motor 302) by the series of high-frequency signal injections at (704). In some embodiments, the one or more signals associated with each of the series of high-frequency signal injections can be one or more current signals induced in a stator of the motor. Those of ordinary skill in the art will understand that the one or more signals associated with each of the series of high-frequency signal injections can include a d-axis component and a q-axis component.

The method 700 can include, at (708), determining one or more operating parameters via the controller based at least in part on the series of estimated injection angles. More particularly, the controller (e.g., controller 310) can be configured to determine one or more operating parameters of the motor (e.g., motor 302) based at least in part on the series of estimated angles determined at (702). In some embodiments, the one or more operating parameters can be indicative of an orientation of a rotor of the motor (e.g., an initial angle of the rotor (e)). In this way, the controller can be configured to determine the orientation of the rotor based at least in part on saturation effects and saliency effects of the motor. Those of ordinary skill in the art will understand that the saturation effects and the saliency effects of the motor can be produced by the series of high-frequency signal injections at (704).

As discussed above with respect to FIGS. 7 and 8, in some embodiments, the method 700 can return to (702) after processing the one or more signals associated with each of the series of high-frequency signal injections (706). In this way, the method 700 can provide for precise control of the motor (e.g., motor 302) by allowing the controller (e.g., controller 310) to more accurately determine the orientation of the rotor based on the saliency and the saturation of the motor such that the stator field is appropriately aligned when the motor is at standstill speeds (e.g., about zero RPMs).

While the present subject matter has been described in detail with respect to specific example embodiments thereof, it will be appreciated that those skilled in the art, upon attaining an understanding of the foregoing can readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A method for operating a salient motor, the method comprising:
   determining, via a controller of the motor, a first estimated injection angle of a series of estimated injection angles;
   injecting, via the controller, a first high-frequency signal into the motor at the first estimated injection angle to provide a first high-frequency signal injection of a series of high-frequency signal injections;
   responsive to the first high-frequency signal injection, processing, via the controller, one or more signals associated with the first high-frequency signal injection;
   determining, via the controller, a second estimated injection angle of the series of estimated injection angles based at least in part on the one or more signals associated with the first high-frequency signal injection;
   injecting, via the controller, a second high-frequency signal into the motor at the second estimated injection angle to provide a second high-frequency signal injection of the series of high-frequency signal injections;
   responsive to the second high-frequency signal injection, processing, via the controller, one or more signals associated with the second high-frequency signal injection;
   determining, via the controller, a third estimated injection angle of the series of estimated injection angles based at least in part on the one or more signals associated with the first high-frequency signal injection and the one or more signals associated with the second high-frequency signal injection;
   injecting, via the controller, a third high-frequency signal into the motor at the third estimated injection angle to provide a third high-frequency signal injection of the series of high-frequency signal injections;
   responsive to the third high-frequency signal injection, processing, via the controller, one or more signals associated with the third high-frequency signal injection; and
   determining, via the controller, one or more operating parameters based at least in part on the first high-frequency signal injection, the second high-frequency signal injection, and the third high-frequency signal injection.

2. The method of claim 1, wherein the one or more operating parameters are indicative of an orientation of a rotor of the motor.

3. The method of claim 2, wherein the orientation of the rotor is determined based at least in part on saturation of the motor.

4. The method of claim 1, wherein the series of high-frequency signal injections comprises a series of high-frequency voltage signals.

5. The method of claim 1, wherein the one or more signals associated with each of the first high-frequency signal injection, the second high-frequency signal injection, and the third high-frequency signal injection comprise a d-axis component and a q-axis component.

6. The method of claim 1, wherein the motor is a permanent magnet synchronous motor (PMSM).

7. The method of claim 1, wherein the motor is a brushless DC (BLDC) motor.

8. The method of claim 1, wherein:
   the one or more signals associated with the first high-frequency signal injection are current signals induced in a stator of the motor in response to the first high-frequency signal injections;
   the one or more signals associated with the second high-frequency signal injection are current signals induced in the stator of the motor in response to the second high-frequency signal injection; and
   the one or more signals associated with the third high-frequency signal injection are current signals induced in the stator of the motor in response to the third high-frequency signal injection.

9. The method of claim 1, wherein determining the second estimated injection angle of the series of estimated injection angles comprises:
   determining, via the controller, the second estimated injection angle based at least in part on the first estimated injection angle and a q-axis current component of the one or more signals associated with the first high-frequency signal injection.

10. The method of claim 1, wherein determining the third estimated injection angle of the series of estimated injection angles comprises:
    determining, via the controller, the third estimated injection angle based at least in part on the first estimated injection angle, a d-axis current component of the one or more signals associated with the first high-frequency signal injection, the second estimated injection angle, and a d-axis current component of the one or more signals associated with the second high-frequency signal injection.

11. A motor assembly for an appliance, comprising:
    a motor comprising at least a rotor and a stator;
    a motor drive;
    a sensorless feedback system configured to determine an orientation of the rotor based at least in part on one or more electrical characteristics of the stator; and
    a controller operably coupled with the sensorless feedback system, the controller configured to:
    determine a first estimated injection angle of a series of estimated injection angles;
    inject a first high-frequency signal into the motor at the first estimated injection angle to provide a first high-frequency signal injection of a series of high-frequency signal injections;
    process one or more signals associated with the first high-frequency signal injection;
    determine a second estimated injection angle of the series of estimated injection angles based at least in part on the one or more signals associated with the first high-frequency signal injection;
    inject a second high-frequency signal into the motor at the second estimated injection angle to provide a second high-frequency signal injection of the series of high-frequency signal injections;
    process one or more signals associated with the second high-frequency signal injection;
    determine a third estimated injection angle of the series of estimated injection angles based at least in part on the one or more signals associated with the first high-frequency signal injection and the one or more signals associated with the second high-frequency signal injection;

inject a third high-frequency signal into the motor at the third estimated injection angle to provide a third high-frequency signal injection of the series of high-frequency signal injections;

process one or more signals associated with the third high-frequency signal injection; and determine one or more operating parameters based at least in part on the first high-frequency signal injection, the second high-frequency signal injection, and the third high-frequency signal injection.

12. The motor assembly of claim 11, wherein each of the first high-frequency signal, the second high-frequency signal, and the third high-frequency signal is a high-frequency voltage signal.

13. The motor assembly of claim 11, wherein the motor is a synchronous motor.

14. The motor assembly of claim 11, wherein the appliance is a stand mixer.

15. The motor assembly of claim 11, wherein the controller is further configured to determine an orientation of the rotor of the motor based at least in part on saturation effects and saliency effects of the motor produced by the series of high-frequency signal injections.

16. An appliance, comprising:
a base;
a head pivotally mounted to the base;
a motor disposed within the head;
a mixer shaft rotatably mounted on the head; and
a controller operably coupled to the motor, the controller configured to:
determine a first estimated injection angle of a series of estimated injection angles;
inject a first high-frequency signal into the motor at the first estimated injection angle to provide a first high-frequency signal injection of a series of high-frequency signal injections;
process one or more signals associated with the first high-frequency signal injection;
determine a second estimated injection angle of the series of estimated injection angles based at least in part on the one or more signals associated with the first high-frequency signal injection;
inject a second high-frequency signal into the motor at the second estimated injection angle to provide a second high-frequency signal injection of the series of high-frequency signal injections;
process one or more signals associated with the second high-frequency signal injection;
determine a third estimated injection angle of the series of estimated injection angles based at least in part on the one or more signals associated with the first high-frequency signal injection and the one or more signals associated with the second high-frequency signal injection;
inject a third high-frequency signal into the motor at the third estimated injection angle to provide a third high-frequency signal injection of the series of high-frequency signal injections;
process one or more signals associated with the third high-frequency signal injection; and
determine one or more operating parameters based at least in part on the first high-frequency signal injection, the second high-frequency signal injection, and the third high-frequency signal injection.

17. The appliance of claim 16, wherein the appliance is a stand mixer.

18. The appliance of claim 16, wherein the motor is a permanent magnet synchronous motor (PMSM).

19. The appliance of claim 16, wherein the motor is a brushless DC (BLDC) motor.

20. The appliance of claim 16, wherein each of the first high-frequency signal, the second high-frequency signal, and the third high-frequency signal is a high-frequency voltage signal.

* * * * *